(12) United States Patent
Suenaga et al.

(10) Patent No.: US 12,552,108 B2
(45) Date of Patent: Feb. 17, 2026

(54) RESIN JOINED BODY MANUFACTURING METHOD

(71) Applicant: ASAHI YUKIZAI CORPORATION, Nobeoka (JP)

(72) Inventors: Hiroshi Suenaga, Nobeoka (JP); Hiroyuki Matsushita, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 1 day.

(21) Appl. No.: 18/715,741

(22) PCT Filed: Dec. 2, 2022

(86) PCT No.: PCT/JP2022/044573
§ 371 (c)(1),
(2) Date: Jun. 3, 2024

(87) PCT Pub. No.: WO2023/101011
PCT Pub. Date: Jun. 8, 2023

(65) Prior Publication Data
US 2025/0033293 A1    Jan. 30, 2025

(30) Foreign Application Priority Data
Dec. 3, 2021   (JP) .................................. 2021-197375

(51) Int. Cl.
*B29C 65/02*   (2006.01)
*B29C 43/00*   (2006.01)
(Continued)

(52) U.S. Cl.
CPC ............ *B29C 65/02* (2013.01); *B29C 43/003* (2013.01); *B29C 69/00* (2013.01);
(Continued)

(58) Field of Classification Search
None
See application file for complete search history.

(56) References Cited

U.S. PATENT DOCUMENTS

| | | | |
|---|---|---|---|
| 4,073,856 A * | 2/1978 | Chu | ................. B29C 66/91431 264/275 |
| 2013/0038053 A1 | 2/2013 | Imanishi et al. | |
| 2016/0319945 A1 | 11/2016 | Yoshida et al. | |

FOREIGN PATENT DOCUMENTS

| | | |
|---|---|---|
| JP | S54-10378 A | 1/1979 |
| JP | H10-138346 A | 5/1998 |

(Continued)

OTHER PUBLICATIONS

International Search Report and Written Opinion for PCT International Application No. PCT/JP2022/044573, Feb. 7, 2023, 12 pp.
(Continued)

*Primary Examiner* — Barbara J Musser
(74) *Attorney, Agent, or Firm* — HAUPTMAN HAM, LLP

(57) ABSTRACT

This method for producing a resin bonded body includes: forming a first resin assembly of a shape having an accommodation portion from a first fluororesin material that is capable of gelling and maintaining shape even at or above the melting point thereof; a step for accommodating a second resin assembly composed of a second fluororesin material that melts and becomes liquid at or above the melting point thereof within the accommodation portion. The method includes heating the first resin assembly having the second resin assembly disposed in the accommodation portion to or above the melting point of the first fluororesin material and the second fluororesin material before cooling the first resin assembly, changing the first resin assembly
(Continued)

into a first resin molded body and the second resin assembly into a second resin molded body, and bonding the first and second resin molded bodies.

15 Claims, 14 Drawing Sheets

(51) Int. Cl.
*B29C 69/00* (2006.01)
*B29K 27/18* (2006.01)
*B29L 31/00* (2006.01)

(52) U.S. Cl.
CPC ... *B29K 2027/18* (2013.01); *B29L 2031/7506* (2013.01); *B29L 2031/755* (2013.01)

(56) References Cited

FOREIGN PATENT DOCUMENTS

| | | | |
|---|---|---|---|
| JP | 2006068910 | A | 3/2006 |
| JP | 2010121689 | A | 6/2010 |
| JP | 2011-226610 | A | 11/2011 |
| JP | 2016-065560 | A | 4/2016 |
| JP | 2016-211618 | A | 12/2016 |
| JP | 2020-200840 | A | 12/2020 |
| JP | 6873991 | B2 | 5/2021 |
| WO | WO-9004511 | A1 * | 5/1990 ........... B29C 66/742 |

OTHER PUBLICATIONS

Japan Patent Office, Decision to Grant a Patent for Japanese Patent Application No. 2023-565108 mailed on Sep. 30, 2025; 6 pp.

* cited by examiner

RESIN JOINED BODY MANUFACTURING METHOD

RELATED APPLICATIONS

The present application is a National Phase of International Application Number PCT/JP2022/044573 filed Dec. 2, 2022 and claims priority to Japanese Application Number 2021-197375 filed Dec. 3, 2021.

TECHNICAL FIELD

The present invention relates to a resin joined body manufacturing method of manufacturing a resin joined body in which two resin molded bodies made of different fluororesin materials are joined to each other.

BACKGROUND ART

For example, in a case where a flow rate of a chemical liquid used in a semiconductor manufacturing apparatus is to be controlled, a diaphragm valve including a diaphragm having is often used. The diaphragm includes a diaphragm portion that partitions a flow channel or a valve chamber, through which chemical flows, from a drive unit, and a valve element portion supported at a center of the diaphragm portion. In the diaphragm valve, the diaphragm portion is elastically deformed repeatedly to cause the valve element portion to come into contact with and be separated from a valve seat, thereby controlling the flow rate. Such a diaphragm portion is required to have chemical resistance because of being in contact with the chemical liquid and is required to have bending durability because of being elastically deformed repeatedly. For this reason, the diaphragm is generally made of polytetrafluoroethylene (PTFE) having high bending durability. Since injection molding cannot be applied to PTFE, the diaphragm is produced by cutting a block body of powdery PTEFE, which is compression molded and then baked. However, in a case where the diaphragm is made of PTFE, there is a concern that particles may be generated from the valve element portion of the diaphragm that repeatedly comes into contact with and is separated from the valve seat because PTFE is likely to generate particles. In semiconductor manufacturing, if particles are mixed into the chemical liquid, the manufacturing yield of semiconductors is significantly affected. Therefore, it is preferable to suppress the generation of particles from the valve element portion of the diaphragm that is in contact with chemical.

As one of methods for suppressing the generation of particles from the valve element portion, it is conceivable to form the valve element portion from perfluoroalkoxy alkane (PFA) that is a fluororesin material less likely to cause the generation of particles. On the other hand, PFA has low bending durability and is not suitable for the diaphragm portion that is elastically deformed repeatedly. Therefore, it has been proposed to bond a valve element portion made of PFA to a diaphragm portion made of PTFE. Thus, there exists a requirement to bond molded bodies made of different fluororesin materials, and solutions to such a requirement have also been proposed.

For example, PTL1 discloses a fluid control valve, provided with a diaphragm member (that is, a diaphragm portion) and a valve seat contact member (that is, a valve element portion), in which: the diaphragm member includes a diaphragm membrane and a rod-like portion provided at the center of the diaphragm membrane and having an uneven outer peripheral surface formed on an outer periphery of a part of the rod-like portion and is made of PTFE that is a first fluororesin material; the valve seat contact member has a valve seat contact surface and a recessed portion provided on a side opposite to the valve seat contact surface and is made of PFA that is an injection-moldable second fluororesin material; and the diaphragm member and the valve seat contact member are bonded to each other by fitting the rod-like portion into the recessed portion such that the uneven outer peripheral surface formed on the outer periphery of the rod-like portion of the diaphragm member and an uneven inner peripheral surface formed on an inner periphery of the recessed portion of the valve seat contact member are tightly engaged with each other. Further, PTL1 discloses a method for manufacturing a fluid control valve that includes an insert molding step of injection molding a second round rod with the second fluororesin material in a state where a first round rod made of the first fluororesin material is inserted therein, and a step of cutting the first round rod to a shape of the above-described diaphragm member and cutting the second round rod to a shape of the above-described valve seat contact member after the insert molding step. Furthermore, PTL2 discloses a method for manufacturing a fluid control device, in which a valve element is constituted by a bonded body having a body member and a seating member, which is to be brought in contact with a valve seat, bonded to each other, and the bonded body is prepared by being scraped off from a material bonded body having a contact surface of a part made of a seating member material, that is a material of the seating member, and a contact surface of a part made of a body member material, that is a material of the body member, which have been melted using irradiation with an infrared beam or a hot plate to be weld to each other.

CITATION LIST

Patent Literature

PTL1: Japanese Patent No. 6873991
PTL2: Japanese Unexamined Patent Publication No. 2020-200840

SUMMARY OF THE INVENTION

Technical Problem

In a case where two resin molded bodies made of different fluororesin materials are bonded to each other by the engagement (mechanical joining) of the uneven surfaces as in the technique disclosed in PTL1, fine gaps may be generated between the uneven surfaces due to a difference in hardness of the materials when, for example, an impact is applied to the resin bonded body as when the valve element and the valve seat come into contact with each other at the time of closing the valve. Further, the bonded bodies expand and contract even due to a temperature change of the fluid, so that a fine gap may be generated between the uneven surfaces. If liquid enters into such a gap and is accumulated, a problem occurs especially in a fluidic device such as a valve in that a valve element portion deteriorates so that particles are increased over time.

Further, even in a case where the bonded body is formed by insert molding as in the technique disclosed in PTL1, a temperature difference between the molded body used as an insert and the resin material part formed by injection molding is large and thermal strain thus occurs on the uneven surfaces, so that a problem also may occur in that the strength of the joining interface is reduced. Likewise, even in a case where two resin molded bodies are welded to each other at a bonding interface using an infrared beam or a hot plate as in the technique disclosed in PTL2, a temperature difference between the melted bonding interface and an unmelted portion is large and thermal strain thus occurs, so that a problem may occur in that a strength of the bonding interface is reduced.

Accordingly, it is an object of the present invention to solve the problems in the prior art and join two resin molded bodies made of different fluororesin materials such that mechanical joining is not used and a strength of a joining interface is not reduced.

Solution to Problem

In view of the above-described object, the present invention provides a resin joined body manufacturing method of manufacturing a resin joined body in which two resin molded bodies made of different fluororesin materials are joined to each other. The resin joined body manufacturing method includes: a step of forming a cup-shaped first resin assembly having a cylindrical accommodation portion from a first fluororesin material that is capable of gelling and maintaining a shape even at a temperature equal to or higher than a melting point thereof; a step of accommodating a second resin assembly in the accommodation portion, the second resin assembly made of a second fluororesin material that is melted to be in a liquid state at a temperature equal to or higher than a melting point thereof; and a step of heating the first resin assembly having the second resin assembly in the accommodation portion thereof, to a temperature equal to or higher than the melting points of the first fluororesin material and the second fluororesin material, and then cooling the first resin assembly and the second resin assembly to change the first resin assembly to a first resin molded body and change the second resin assembly to a second resin molded body while joining the first resin molded body and the second resin molded body to each other.

In the above-described resin joined body manufacturing method, the second resin assembly made of the second fluororesin material is accommodated in the cylindrical accommodation portion of the cup-shaped first resin assembly made of the first fluororesin material. Therefore, the second fluororesin material can be easily held in the first resin assembly regardless of a form thereof. Further, the first resin assembly is made of the first fluororesin material that can gel (that is, can be in a gel state) and maintain a shape even though being melted at a temperature equal to or higher than a melting point thereof. Therefore, even though the second resin assembly made of the second fluororesin material is melted to be in a liquid state at a temperature equal to or higher than the melting points of the first fluororesin material and the second fluororesin material (that is, a temperature equal to or higher than higher one of the melting point of the first fluororesin material and the melting point of the second fluororesin material), a state where the second resin assembly is held in the accommodation portion of the first resin assembly can be maintained. Furthermore, when the first resin assembly having the second resin assembly accommodated in the accommodation portion thereof is heated, both the first resin assembly and the second resin assembly are heated as a whole and melted at a temperature equal to or higher than the melting points and the first fluororesin material forming the first resin assembly and the second fluororesin material forming the second resin assembly are integrated with each other. When the heated first resin assembly having the second resin assembly accommodated in the accommodation portion thereof is cooled, the first resin molded body made of the first fluororesin material and the second resin molded body made of the second fluororesin material are integrally molded (hereinafter, referred to as "integral melt molding"). As a result, a joined body in which the first resin assembly and the second resin assembly are integrally joined to each other can be manufactured. In addition, since the first resin molded body and the second resin molded body are heated as a whole and then integrally melted and molded, the occurrence of thermal strain can be suppressed.

In the resin joined body manufacturing method, it is preferable that the first resin assembly is formed in a cup shape having a recessed portion at an end portion thereof.

The first resin assembly may include a cylindrical tubular body, and the tubular body may have an inside serving as the accommodation portion. In this case, it is preferable that the first resin assembly is configured by the cylindrical tubular body and a solid rod-like body or a plate-like body that is disposed adjacent to a lower portion of the cylindrical tubular body.

In the resin joined body manufacturing method, the first resin assembly may be a round rod or a plate molded with the first fluororesin material or be formed from the rod or a plate formed by cutting, or may be formed by cold compression molding or pre-forming of the first fluororesin material.

Further, in the resin joined body manufacturing method, the second resin assembly may be formed by molding of the second fluororesin material to have a shape and a size that allow the second resin assembly to be accommodated in the accommodation portion. In this case, the second resin assembly can also be formed by cold compression molding or pre-forming of the second fluororesin material to have a shape and a size that allow the second resin assembly to be accommodated in the accommodation portion. Furthermore, the second resin assembly may be formed by powder or pellets of the second fluororesin material. Since the second fluororesin material is accommodated and held in the accommodation portion of the first resin assembly, the second fluororesin material can be formed in various forms even if the second fluororesin material is a material that is melted to be in a liquid state at a temperature equal to or higher than a melting point thereof.

It is preferable that the first fluororesin material is polytetrafluoroethylene (PTFE) and the second fluororesin material is perfluoroalkoxy alkane (PFA).

In one embodiment, the resin joined body manufacturing method may further include a diaphragm manufacturing step of manufacturing a diaphragm for a diaphragm valve from the resin joined body, the diaphragm having a diaphragm portion and a valve element portion supported at a center of the diaphragm portion which comes into contact with and is separated from a valve seat. The diaphragm manufacturing step may include: a step of manufacturing a resin joined body in which the first resin molded body and the second resin molded body are joined to each other; a step of performing cutting on a portion of the resin joined body constituted by the second resin molded body to form at least a portion of the valve element portion which comes into contact with the valve seat; and a step of performing cutting on a portion of the resin joined body constituted by the first resin molded body to form the diaphragm portion and a remaining portion of the valve element portion.

In the diaphragm manufacturing step, the diaphragm portion to be repeatedly deformed may be made of PTFE having high bending durability, and at least a portion of the valve element portion coming into contact with the valve seat may be made of PFA having low dusting characteristics. Therefore, it is possible to suppress the generation of particles that is caused by contact and separation between the valve element portion and the valve seat while ensuring the bending durability of the diaphragm portion.

In another embodiment, the resin joined body manufacturing method may further include a diaphragm valve manufacturing step of manufacturing a diaphragm valve from the joined body. The diaphragm valve including a valve body having formed therein a first flow channel, a second flow channel, and a valve chamber being in communication with the first flow channel and the second flow channel, and a diaphragm having a diaphragm portion and a valve element portion supported at a central portion of the diaphragm portion, in which the diaphragm valve manufacturing step includes a step of performing cutting on the resin joined body to form the first flow channel, the second flow channel, and the valve chamber from the resin joined body such that the valve seat is formed in at least the second resin molded body of the resin joined body.

In the diaphragm valve manufacturing step, the valve seat that is likely to generate particles due to contact with and separation from the valve element portion can be produced from the second resin molded body made of PFA having low dusting characteristics. Therefore, it is possible to suppress the generation of particles that is caused by contact and separation between the valve element portion and the valve seat. Further, since a remaining portion of the valve body of the diaphragm valve can be produced with PTFE more inexpensive than PFA, the amount of PFA used for the diaphragm valve (specifically, the valve body) can be reduced and the cost of a raw material can be reduced as compared to a case where the entire valve body is made of PFA.

Advantageous Effect of the Invention

According to the present invention, in a case where the first resin assembly having the second resin assembly accommodated in the cylindrical accommodation portion thereof is heated, both the first resin assembly and the second resin assembly are heated as a whole to a temperature equal to or higher than the melting points of the first fluororesin material and the second fluororesin material, and both the first fluororesin material forming the first resin assembly and the second fluororesin material forming the second resin assembly are melted and integrated with each other. At this case, the first resin assembly gels and maintains a shape, and therefore the second resin assembly melt to be in a liquid state is held in the accommodation portion of the first resin assembly maintaining the cylindrical shape and is integrated with the first resin assembly. When the heated first resin assembly having the second resin assembly accommodated in the accommodation portion thereof is cooled, the first resin molded body made of the first fluororesin material and the second resin molded body made of the second fluororesin material are integrally melted and molded. As a result, a joined body in which the first resin assembly and the second resin assembly are integrally joined to each other can be manufactured. Since it is possible to manufacture a joined body in which molded bodies made of different fluororesin materials are integrally joined by integral melt molding, it is possible to prevent a gap from being generated between joining surfaces of the two resin molded bodies even through an impact is applied to the joined body at the time of closing the valve in a case where a diaphragm is manufactured from the joined body. Further, since the two resin assemblies are heated at the same time, it is possible to suppress the occurrence of thermal strain. As a result, it is possible to prevent a strength of a joining interface between the first resin molded body and the second resin molded body from being reduced.

DESCRIPTION OF EMBODIMENTS

Embodiments of a resin joined body manufacturing method according to the present invention will be described below with reference to the drawings.

Figure 1:
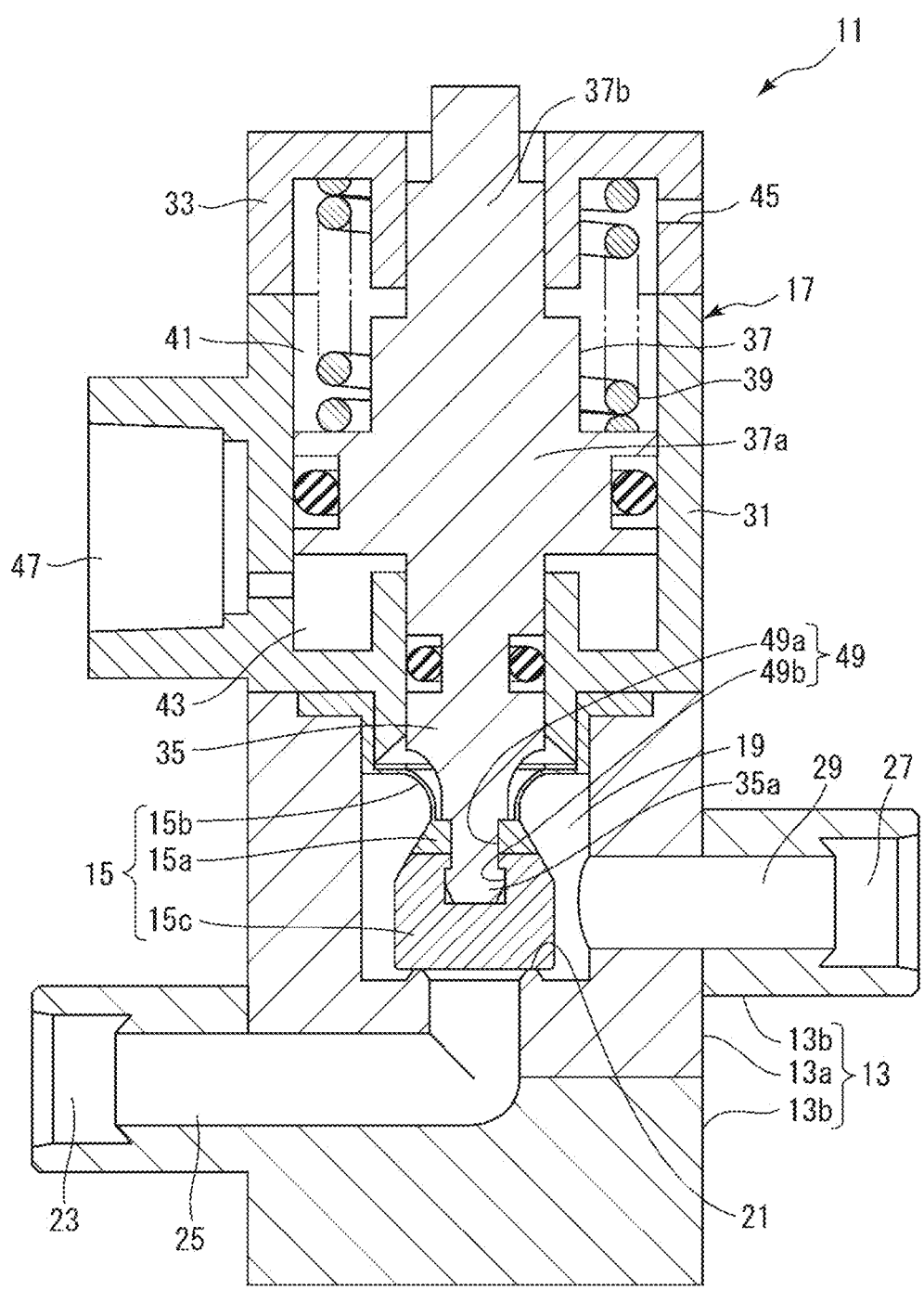
FIG. 1 is a cross-sectional view showing an overall configuration of one embodiment of a diaphragm valve including a valve body and a diaphragm that are produced from a resin joined body manufactured by a resin joined body manufacturing method according to the present invention.

First, an overall configuration of one embodiment of a diaphragm valve using a diaphragm and a valve body which are produced from a resin joined body manufactured by the resin joined body manufacturing method according to the present invention will be described with reference to FIG. 1. A diaphragm valve 11 includes a valve body 13, a diaphragm 15, and a drive unit 17 that drives the diaphragm 15, and the drive unit 17 is mounted on an upper portion of the valve body 13.

The valve body 13 has a valve chamber 19 formed at a center of the upper portion thereof and has formed therein a first flow channel and a second flow channel being in communication with the valve chamber 19. An annular valve seat 21 which the diaphragm 15 comes into contact with and is separated from is formed in the valve chamber 19 around an opening from the first flow channel to the valve chamber 19. In the shown embodiment, there is formed as the first flow channel an inlet flow channel 25 that extends from an inflow port 23 formed on one of opposed side surfaces of the valve body 13 and is opened at a center of a bottom portion of the valve chamber 19, and there is formed as the second flow channel an outlet flow channel 29 that extends from an outflow port 27 formed on the other of the opposed side surfaces of the valve body 13 and is opened on a side surface of the valve chamber 19. There is an annular valve seat 21 formed on a part surrounding an opening from the inlet flow channel 25 to the valve chamber 19.

The drive unit 17 is provided with: a drive unit housing 31 which is mounted on the upper portion of the valve body 13 and has a mechanism accommodation space formed therein; a lid member 33 that is mounted on an upper portion of the drive unit housing 31; a stem 35 that is connected to the diaphragm 15; and a drive mechanism that is accommodated in the mechanism accommodation space and drives the stem 35. In the present embodiment, there is a cylinder portion formed in the drive unit housing 31 as the mechanism accommodation space, and the drive mechanism is constituted by a piston 37 accommodated in the cylinder portion and a coil spring 39 serving as a biasing member.

The piston 37 includes a piston body 37a slidably accommodated in the cylinder portion of the drive unit housing 31 and a guide shaft 37b extending upward from the piston body 37a, and the stem 35 is connected to the piston body 37a to extend downward from the piston body 37a. The stem 35 is slidably inserted into a through-hole provided to penetrate a bottom portion of the drive unit housing 31, and has a distal end connected to the diaphragm 15 (specifically, a valve element portion 15c described later). The piston body 37a has n outer peripheral surface that is in contact with an inner peripheral surface of the cylinder portion to be slidable in an up-down direction, and partitions an internal space of the cylinder portion into an upper space 41 surrounded by an upper surface of the piston body 37a, an inner peripheral wall of the cylinder portion, and a ceiling surface of the cylinder portion (that is, a lower surface of the lid member 33) and a lower space 43 surrounded by a lower surface of the piston body 37a, the inner peripheral wall of the cylinder portion, and a bottom surface of the cylinder portion (that is, the bottom portion of the drive unit housing 31). The guide shaft 37b is slidably inserted into a through-hole provided to penetrate the lid member 33, and guides the upward and downward movement of the piston 37.

The lid member is formed with a vent hole 45 that is in communication with a part of the cylinder portion which defines upper space 41, so that ventilation can be performed between the upper space 41 and the outside through the vent hole 45. The drive unit housing 31 is formed in a side portion thereof with a working fluid supply port 47 that is in communication with a bottom portion of a part of the cylinder portion which defines the lower space 43, so that working fluid can be supplied into the lower space 43 from the working fluid supply port 47. Further, the coil spring 39 is disposed between the lower surface (the ceiling surface of the cylinder portion) of the lid member 33 and the upper surface of the piston body 37a in a compressed state.

The diaphragm 15 includes a diaphragm portion 15b having a base portion 15a protruding downward at a central portion thereof, and a valve element portion 15c joined to the base portion 15a. The diaphragm portion 15b is formed to extend outward in a radial direction from an outer peripheral portion of an upper end portion of the base portion 15a, and an outer periphery of the diaphragm portion 15b has a substantially circular shape. The diaphragm portion 15b has an outer peripheral edge portion sandwiched between an upper surface of a peripheral region of an upper opening of the valve chamber 19 of the valve body 13 and a bottom surface of the drive unit housing 31. The valve element portion 15c has a shape in which a truncated cone is connected to a column, and is disposed such that a bottom surface (valve seat contact surface) of the valve element portion 15c faces the valve seat 21. The base portion 15a is joined to the valve element portion 15c such that a peripheral surface of the base portion 15a is smoothly connected to a side surface of the truncated cone of the valve element portion 15c. In this way, the diaphragm 15 partitions off the valve chamber 19 and the drive unit 17 from each other in a state where the valve element portion 15c is supported above the valve chamber 19 via the diaphragm portion 15b.

In the shown embodiment, there is provided a connecting hole 49 that penetrates the base portion 15a of the diaphragm 15 and extends to the valve element portion 15c. Further, the connecting hole 49 includes a small-diameter hole portion 49a positioned on a side close to the drive unit 17 and a large-diameter hole portion 49b provided at a lower end portion of the connecting hole 49 positioned in the valve element portion 15c. The stem 35 is provided at a distal end (lower end portion) thereof with a locking portion 35a that is larger than an intermediate portion, and the diaphragm 15 and the stem 35 are connected to each other by press-fitting the locking portion 35a to the large-diameter hole portion 49b through the small-diameter hole portion 49a, so that the diaphragm 15 (specifically, the valve element portion 15c thereof) can come into contact with and be separated from the valve seat 21 via the stem 35 as the piston 37 is moved upward and downward. In a case where the stem 35 is connected to the valve element portion 15c as described above, it is possible to prevent the stem 35 from being separated from the diaphragm 15 even if the base portion 15a and the valve element portion 15c are peeled off from each other. In the shown embodiment, the stem 35 is connected to the valve element portion 15c. However, as long as the valve element portion 15c can come into contact with and be separated from the valve seat 21 via the stem 35 as the piston 37 is moved upward and downward, for example, the stem 35 may be connected to only the base portion 15a joined to the valve element portion 15c or may have other configuration.

Further, in the shown embodiment, the valve body 13 includes a first valve body portion 13a formed with the valve chamber 19 and a second valve body portion 13b that is a remaining portion, the first valve body portion 13a is made of low-dusting perfluoroalkoxy alkane (PFA), and the second valve body portion 13b is made of polytetrafluoroethylene (PTFE) that is more inexpensive than PFA and has bending durability higher than PFA. Since the valve chamber 19 including the valve seat 21 that comes into contact with and is separated from the valve element portion 15c is made of PFA as described above, it is possible to suppress the generation of particles caused by contact between the valve element portion 15c and the valve seat 21. Further, since the second valve body portion 13b is made of PTFE that is more inexpensive than PFA, it is possible to reduce the cost of the raw material of the valve body 13 while suppressing the generation of particles, as compared to a case where the entire valve body 13 is made of PFA. In addition, since the diaphragm 15, especially the diaphragm portion 15b thereof, is a portion to be repeatedly bent, the base portion 15a and the diaphragm portion 15b are made of PTFE having high bending durability. On the other hand, since the valve element portion 15c is likely to generate particles due to contact with the valve seat 21, the valve element portion 15c is made of PFA having low dusting characteristics. Chemically modified PTFE or PFA, or PTFE or PFA crosslinked by an ionizing radiation may be used as the PTFE or PFA forming the valve body 13 or the diaphragm 15. In particular, it is preferable that the PTFE is chemically modified PTFE. The drive unit housing 31, the lid member 33, the stem 35, and the piston 37 of the drive unit 17 can be made of appropriate materials, such as polyvinylidene fluoride (PVDF), PTFE, PFA, and polychlorotrifluoroethylene (PCTFE).

As described above, in the shown embodiment, the valve body 13 and the diaphragm 15 include portions made of different fluororesin materials, that is, PTFE and PFA. In such a case, in the prior art, two parts made of different materials are mechanically joined to each other as described in PTL 1, are welded to each other as described in PTL2, or are bonded to each other using an adhesive. However, in a case of mechanical joining, at a portion, such as the diaphragm 15 (particularly, the valve element portion 15c thereof), that comes into contact with and is separated from the valve seat 21 and receives an impact, a gap may be generated, for example, between joining surfaces of the base portion 15a and the valve element portion 15c due to deformation caused by the impact, so that particles may be likely to be generated since materials may deteriorate due to liquid in the valve chamber 19 entering the gap. Further, in a case of welding, only a joining interface, for example, between the base portion 15a and the valve element portion 15c, is heated and melted by an infrared beam or the like. Therefore, thermal strain occurs due to a temperature difference between a melted portion and a non-melted portion, and a problem occurs in that the strength of the joining interface is reduced. Furthermore, in a case where an adhesive is used, there is a concern that components of the adhesive may be eluted from the joining interface between the base portion 15a and the valve element portion 15c and mixed into liquid in the valve chamber 19 since the base portion 15a and the valve element portion 15c are particularly disposed in the valve chamber 19.

In the present invention, a first resin assembly 51 having a cylindrical accommodation portion 51a is produced with PTFE, the first resin assembly 51 having a second resin assembly 53, made of PFA, accommodated in the accommodation portion 51a thereof is heated to a temperature equal to or higher than melting points of PTFE and PFA (that is, a temperature equal to or higher than higher one of the melting points of PTFE and PFA) and the first resin assembly 51 made of PTFE and the second resin assembly 53 made of PFA are melted to be integrally molded (hereinafter, referred to as "integral melt molding"), thereby manufacturing an integrated resin joined body, and cutting is performed on the manufactured resin joined body to produce the valve body 13 and the diaphragm 15 including a portion made of PTFE and a portion made of PFA as described above. The heating of the first resin assembly 51 and the second resin assembly 53 (that is, PTFE and PFA forming the respective first and second resin assemblies) to a temperature equal to or higher than the melting points thereof does not particularly need to be performed under pressure, and may be performed in a state where pressure is not applied (a state where pressurization is not particularly performed).

In this specification, "integral melt molding" means that all of two objects are melted and integrated to be integrally joined to each other, and is used as a concept that excludes "welding" in which only bonding surfaces of solidified objects are melted and bonded to each other, "insert molding" in which only one object is melted, and the like and is different from these. Further, "resin assembly" in this specification means an object prepared into a predetermined shape formed from powdery or pellet-shaped resin material, and includes an object prepared into the predetermined shape, for example, by cold compression molding or preforming of powder of a resin material, or by cutting of a plate or a rod-like body molded by compression molding or injection molding of a resin material, and a object constituted by a powdery or pellet-shaped resin material that is filled in a mold or the like. It does not matter whether or not the resin material is in a solid state. Furthermore, the "resin assembly" does not need to be integrally formed and may be formed of the assembly of a plurality of individual components.

Figure 2:
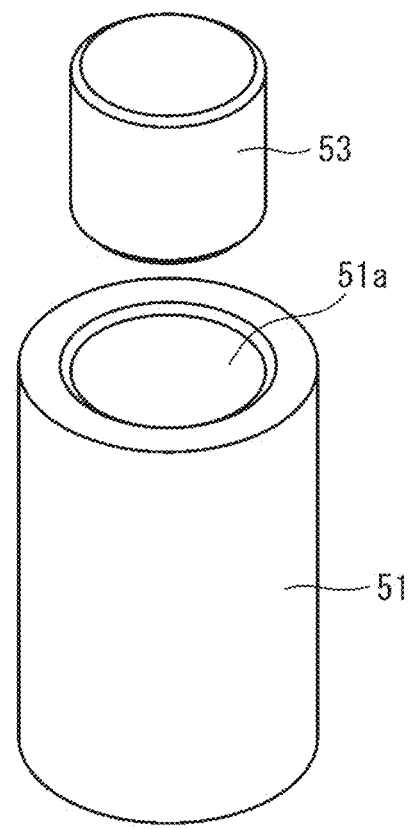
FIG. 2 is a diagram illustrating a first embodiment of the resin joined body manufacturing method according to the present invention.

A first embodiment of a resin joined body manufacturing method for manufacturing a resin joined body in which a first resin molded body made of a first fluororesin material and a second resin molded body made of a second fluororesin material are joined to each other will be described in detail below with reference to FIGS. 2 and 3. A case where PTFE is used as the first fluororesin material and PFA is used as the second fluororesin material will be exemplified below. Chemically modified PTFE or PFA, or PTFE or PFA crosslinked by an ionizing radiation may be used as the PTFE or PFA. In particular, it is preferable that the PTFE is chemically modified PTFE.

First, the first resin assembly 51 having the cylindrical accommodation portion 51a is produced with PTFE that is the first fluororesin material. In the first embodiment, a cup-shaped first resin assembly 51 having a recessed portion serving as the accommodation portion 51a at an upper end portion thereof as shown in FIG. 2 is produced. The first resin assembly 51 may be produced by performing compression-molding of PTFE in a mold according to a free baking method, a hot molding method or the like to form a rod-like body or a plate and cutting the rod-like body or plate to provide a recessed portion at an upper end portion of the rod-like body or plate. Likewise, the first resin assembly 51 may be produced by performing compression-molding of PTFE in mold according to a free baking method, a hot molding method or the like to form a cup-shaped rod-like body or a plate having a recessed portion at an upper end portion thereof. Further, the first resin assembly 51 does not need to be integrally formed, and may be produced by combining, for example, a cylindrical tubular body with a solid rod-like body or a plate-like body (including a sheet-like body) to be disposed adjacent to a lower portion of the cylindrical tubular body. In this case, the tubular body and the rod-like body or the plate-like body may be joined to each other by screwing or male-female fitting. Furthermore, in a case where the tubular body and the rod-like body or the plate-like body (including the sheet-like body) are integrally formed, the tubular body and the rod-like body or the plate-like body may be individually produced and then bonded by welding. The welding can be performed by, for example, laser welding, hot plate welding, hot air welding, or baking. In a case where the first resin assembly 51 is produced from a rod-like body made of PTFE, the rod-like body made of PTFE may be produced by extrusion molding. In addition, a second resin assembly 53 having a shape and a size that allow the second resin assembly 53 to be accommodated in the accommodation portion 51a (recessed portion) of the first resin assembly 51 as shown in FIG. 2, is produced with PFA that is the second fluororesin material. It is preferable that the second resin assembly 53 is a rod-like body having an outer peripheral shape complementary to an inner peripheral surface of the cylindrical accommodation portion 51a. However, the second resin assembly is heated to a temperature equal to or higher than the melting point thereof and is melted to be in a liquid state, so that the second resin assembly will be changed into a form which has a shape complementary to the inner peripheral surface of the accommodation portion 51a. Therefore, the second resin assembly 53 may have any shape and size that allow the second resin assembly to be accommodated in the accommodation portion 51a. Further, the height of the second resin assembly may be substantially equal to the depth of the accommodation portion 51a or may be smaller than the depth of the accommodation portion 51a as long as the second resin assembly does not overflow from the accommodation portion 51a in a case where the second resin assembly is changed into a liquid state by being heated to a temperature equal to or higher than the melting point thereof. The second resin assembly can be directly produced, for example, with PFA by extrusion molding or injection molding using a mold.

Next, the first resin assembly 51 having the second resin assembly 53 accommodated in the accommodation portion 51a (recessed portion) thereof is heated in a baking furnace to be baked. Since the first resin assembly 51 is made of PTFE, the first resin assembly 51 can gel and maintain a cup shape even though the first resin assembly 51 is heated to a temperature equal to or higher than the melting point thereof to be melted. On the other hand, since the second resin assembly 53 is made of PFA, the second resin assembly 53 is changed into a liquid state when the second resin assembly 53 is heated to a temperature equal to or higher than the melting point thereof to be melted. However, since the second resin assembly 53 is accommodated in the accommodation portion 51a of the first resin assembly 51 that can gel and maintain the cup shape even though the first resin assembly 51 is heated to a temperature equal to or higher than the melting point thereof to be melted, a state where the second resin assembly 53 is held in the accommodation portion 51a can be maintained even though the second resin assembly 53 is changed into a liquid state by being heated to a temperature equal to or higher than the melting point thereof to be melted. Therefore, since a mold for maintaining a state where the PFA is in contact with the PTFE is not necessary even though the PFA is changed into a liquid state, manufacturing cost can be reduced. The first resin assembly 51 and the second resin assembly 53 are integrally melted and molded by being heated to a temperature equal to or higher than melting points of PTFE that is the first fluororesin material and PFA that is the second fluororesin material (that is, a temperature equal to or higher than higher one of the melting points of PTFE and PFA) to be melted, and are integrally joined to each other. Further, the heating of the first resin assembly 51 and the second resin assembly 53 does not particularly need to be performed under pressure, and can be performed in a state where pressure is not applied (a state where pressurization is not particularly performed). Since heating is performed in a state where pressure is not applied to integrally melt and mold the first resin assembly 51 and the second resin assembly 53, the generation of deformation or residual stress can be suppressed unlike in other methods.

Figure 3:
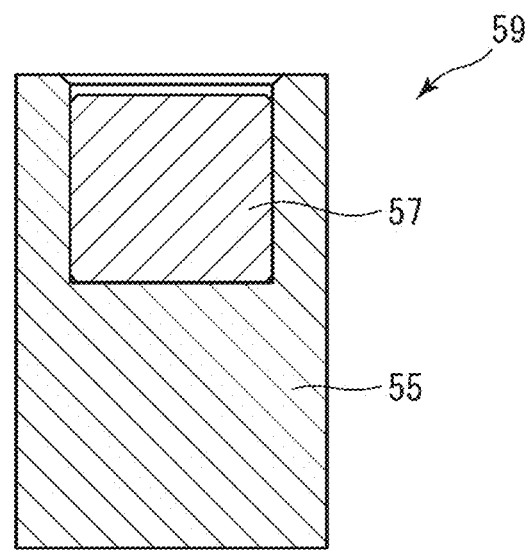
FIG. 3 is a cross-sectional view showing a resin joined body that is manufactured by the resin joined body manufacturing method according to the present invention.

When the first resin assembly 51 and the second resin assembly 53 are heated to a temperature equal to or higher than the melting points of PTFE and PFA and then cooled in the baking furnace in a state where the second resin assembly 53 is accommodated in the accommodation portion 51a (recessed portion) of the first resin assembly 51, the first resin assembly 51 becomes a first resin molded body 55 and the second resin assembly 53 becomes a second resin molded body 57 having a shape substantially complementary to the accommodation portion 51a (recessed portion) as shown in FIG. 3, so that a resin joined body 59 in which the first resin molded body 55 and the second resin molded body 57 are integrally joined to each other over the entire contact surface therebetween as a whole is obtained.

Since the first resin molded body 55 and the second resin molded body 57 are integrated with and joined to each other over the entire contact surface therebetween in the resin joined body 59 manufactured in this way, a gap is not generated between the first resin molded body 55 and the second resin molded body 57 even though an external force is applied to the resin joined body 59. Further, since the first resin molded body 55 and the second resin molded body 57 are heated as a whole to be melted, thermal strain does not occur. As a result, a strength of a joining interface between the first resin molded body 55 and the second resin molded body 57 is also not reduced due to the occurrence of thermal strain. When a tensile test was performed using a rod-like test piece formed of the resin joined body 59 manufactured by the above-described method, it was confirmed that the resin joined body 59 had such a joining strength that other portions were broken prior to a joined portion between the first resin molded body 55 and the second resin molded body 57 and the joined portion was not peeled off.

In the resin joined body manufacturing method according to the present invention for manufacturing the resin joined body 59 in which the first resin molded body 55 made of the first fluororesin material and the second resin molded body 57 made of the second fluororesin material are joined to each other, it is sufficient that the first resin assembly 51 having the accommodation portion 51a is produced with the first fluororesin material, the second resin assembly 53 made of the second fluororesin material is accommodated in the accommodation portion 51a (recessed portion) of the first resin assembly 51, and the second fluororesin material of the second resin assembly 53 in a liquid state can be held in the accommodation portion 51a of the first resin assembly 51 which gels in a case where first resin assembly 51 is heated to a temperature equal to or higher than the melting points of the first fluororesin material and the second fluororesin material. Therefore, the resin joined body manufacturing method for manufacturing the resin joined body 59 in which the first resin molded body 55 made of PTFE and the second resin molded body 57 made of PFA are joined to each other is not limited to the first embodiment.

In the first embodiment, the powder or pellets of PFA filled in the accommodation portion 51a (recessed portion) of the first resin assembly 51 may be used as the second resin assembly 53 instead of the second resin assembly 53 produced with PFA by a molding method, such as extrusion molding or injection molding. Since the first resin assembly 51 is formed in a cup shape, the second resin assembly can be held in the accommodation portion 51a even though the second resin assembly is constituted by the powder or pellets of PFA. Further, when the powder or pellets of PFA, which is the second fluororesin material, are heated to a temperature equal to or higher than the melting point thereof in a baking furnace, the powder or the pellets are melted and changed into a liquid state in the accommodation portion 51a of the first resin assembly 51 that can maintain a shape even though gelling, as with the second resin assembly 53 in the resin joined body manufacturing method according to the first embodiment. Therefore, the PFA which is the second fluororesin material is in contact with the bottom surface and the peripheral surface of the accommodation portion 51a of the first resin assembly 51 with no gap and is integrated with the PTFE of the first resin assembly 51 having gelled. When the heated PFA and the PTFE are cooled, the resin joined body 59 in which the first resin molded body 55 formed from the first resin assembly 51 and the second resin molded body 57 formed from the second resin assembly 53 are integrally joined to each other can be manufactured without using a mold as in the first embodiment of the resin joined body manufacturing method. Furthermore, the resin joined body 59 manufactured by such a method can have the same characteristics as the resin joined body 59 manufactured by the first embodiment of the resin joined body manufacturing method.

In addition, as a second embodiment of the resin joined body manufacturing method for manufacturing the resin joined body 59 in which the first resin molded body 55 and the second resin molded body 57 are joined to each other, an object, which is formed in a cup shape by cold compression molding of the powder of PTFE to have a cylindrical accommodation portion 51a (recessed portion), may be used as the first resin assembly 51 instead of the molded body produced with the powder of PTFE in the resin joined body manufacturing method according to the first embodiment, and an object, which is formed by cold compression molding of the powder of PFA to have a shape and a size allowing the object to be accommodated in the accommodation portion 51a of the first resin assembly 51, may be used as the second resin assembly 53 instead of the molded body produced with the powder of PFA in the resin joined body manufacturing method according to the first embodiment. The first resin assembly 51 does not need to be integrally formed as in the first embodiment. For example, a cylindrical tubular body and a solid rod-like body or a plate-like body (including a sheet-like body) to be disposed adjacent to a lower portion of the cylindrical tubular body may be individually formed by cold compression molding and then combined with each other to produce the first resin assembly 51. Further, in a case where a tubular body and a rod-like body or a plate-like body (including a sheet-like body) are to be integrally formed, the tubular body and the rod-like body or the plate-like body may be individually produced and then boned to each other by welding. The welding can be performed by, for example, laser welding, hot plate welding, hot air welding, or baking.

When a first resin assembly 51 having a cylindrical accommodation portion 51a (recessed portion) at an upper end portion thereof and formed in a cup shape by cold compression molding is heated to a temperature equal to or higher than a melting point thereof in a baking furnace, the first resin assembly 51 can also gel and maintain the cup shape even though being melted as with the first resin assembly 51 that is formed in a cup shape by a molding method, such as extrusion molding or injection molding. Further, when a second resin assembly 53 formed by cold compression molding is heated to a temperature equal to or higher than a melting point thereof in the baking furnace, the second resin assembly 53 is also melted and changed into a liquid state as with the second resin assembly 53 that is formed by a molding method, such as extrusion molding or injection molding. Therefore, the PFA which is the second fluororesin material is in contact with the bottom surface and the peripheral surface of the accommodation portion 51a of the first resin assembly 51 with no gap and is integrated with the PTFE of the first resin assembly 51 having gelled. When the heated PFA and PTFE are cooled, the resin joined body 59 in which the first resin molded body 55 formed from the first resin assembly 51 and the second resin molded body 57 formed from the second resin assembly 53 are integrally joined to each other by integral melt molding can be manufactured without using a mold as in the first embodiment of the resin joined body manufacturing method. Furthermore, the resin joined body 59 manufactured by such a method can have the same characteristics as the resin joined body 59 manufactured by the first embodiment of the resin joined body manufacturing method.

Figure 4:
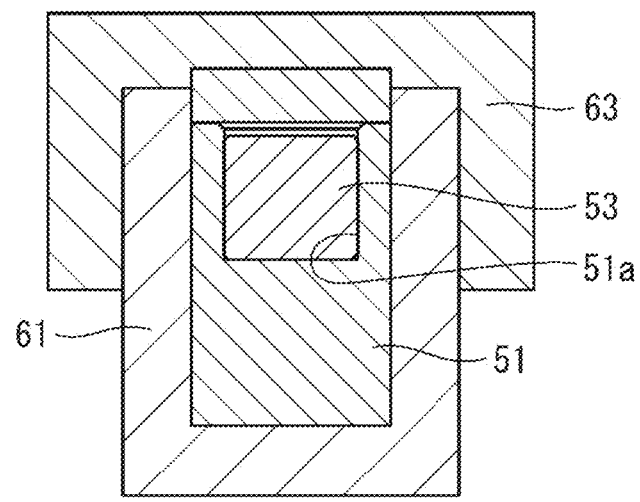
FIG. 4 is a diagram illustrating a second embodiment of the resin joined body manufacturing method according to the present invention.

In the second embodiment of the resin joined body manufacturing method, it is preferable that, in a state where the first resin assembly 51 having the second resin assembly 53 accommodated in the accommodation portion 51a (recessed portion) thereof is disposed in a mold 61 and a side of the mold 61 on which the second resin assembly 53 is disposed is covered with a heat insulating member 63 as shown in FIG. 4, the mold 61 is heated in a baking furnace. Since the side on which the second resin assembly 53 made of PFA having a low melting point is disposed is covered with the heat insulating member 63, it is difficult for the heat of the baking furnace to be transferred to the second resin assembly 53. As a result, the PTFE forming the first resin assembly 51 and the PFA forming the second resin assembly 53 can be melted substantially at the same time.

In the second embodiment of the resin joined body manufacturing method, the powder or pellets of PFA filled in the accommodation portion 51a (recessed portion) of the first resin assembly 51 can also be used as the second resin assembly 53 instead of the second resin assembly 53 produced by cold compression molding. In a case where pellets of PFA which is the second fluororesin material are employed rather than powder of PFA, a time until PFA is melted can be delayed.

In addition, as a third embodiment of the resin joined body manufacturing method of manufacturing the resin joined body 59 in which the first resin molded body 55 and the second resin molded body 57 are joined to each other, an object, which is formed in a cup shape to have a recessed portion serving as the accommodation portion 51a by pre-forming of the powder of PTFE, can be used as the first resin assembly 51 instead of the molded body produced with the powder of PTFE in the first embodiment of the resin joined body manufacturing method, an object, which is formed by pre-forming of the powder of PFA molding to have a shape and a size allowing the object to be accommodated in the accommodation portion 51a of the first resin assembly 51, can be used as the second resin assembly 53 instead of the molded body produced with the powder of PFA in the first embodiment of the resin joined body manufacturing method, and the resin joined body 59 can also be produced by hot molding. In this case, the first resin assembly 51 having the second resin assembly 53 accommodated in the accommodation portion 51a thereof is disposed in the mold 61 and heated. The first resin assembly 51 does not need to be integrally formed as in the first embodiment. For example, a cylindrical tubular body and a solid rod-like body or a plate-like body (including a sheet-like body) to be disposed adjacent to a lower portion of the cylindrical tubular body may be individually formed by pre-forming and then combined with each other to produce the first resin assembly 51.

When a first resin assembly 51 formed by pre-forming in a cup shape to have a recessed portion serving as the accommodation portion 51a at an upper end portion thereof is heated to a temperature equal to or higher than a melting point thereof, the first resin assembly 51 can also gel and maintain the cup shape even though being melted as with the first resin assembly 51 that is formed in a cup shape by a molding method, such as extrusion molding or injection molding. Further, when a second resin assembly 53 formed by the pre-forming is heated to a temperature equal to or higher than a melting point thereof, the second resin assembly 53 is also melted and changed into a liquid state as with the second resin assembly 53 that is formed by a molding method, such as extrusion molding or injection molding. Therefore, the PFA which is the second fluororesin material is in contact with the bottom surface and the peripheral surface of the accommodation portion 51a of the first resin assembly 51 with no gap and is integrated with the PTFE of the first resin assembly 51 having gelled. When the heated PFA and PTFE are cooled, the resin joined body 59 in which the first resin molded body 55 formed from the first resin assembly 51 and the second resin molded body 57 formed from the second resin assembly 53 are integrally bonded to each other by integral melt molding can be manufactured as in the first embodiment of the resin joined body manufacturing method. The resin joined body 59 manufactured by such a method can also have the same characteristics as the resin joined body 59 manufactured by the first embodiment of the resin joined body manufacturing method.

Figure 5:
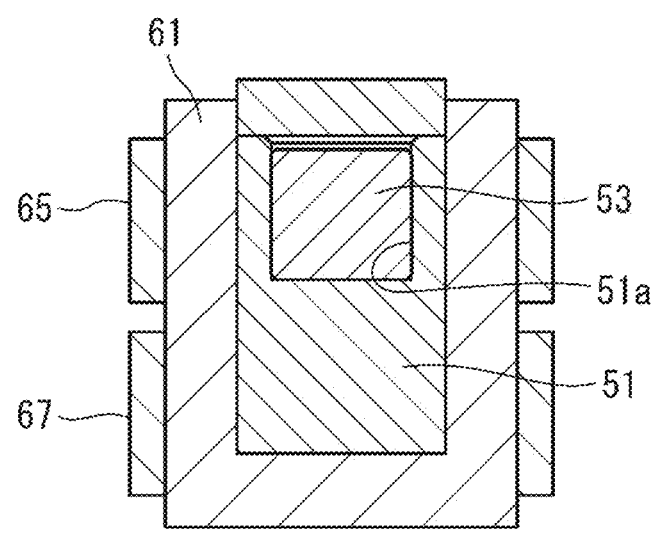
FIG. 5 is a diagram illustrating a third embodiment of the resin joined body manufacturing method according to the present invention.

In the third embodiment of the resin joined body manufacturing method, it is preferable that, as shown in FIG. 5, the first resin assembly 51 having the second resin assembly 53 accommodated in the accommodation portion 51a (recessed portion) thereof is disposed in a mold 61, the periphery of a portion of the mold 61 in which the second resin assembly 53 is disposed is heated by a first band heater 65, and a lower portion thereof is heated by a second band heater 67. Since the different band heaters 65 and 67 are used, a heating temperature of the first band heater 65 for heating the portion in which the second resin assembly 53 made of PFA having a relatively low melting point is disposed can be set to be lower than a heating temperature of the second band heater 67 for heating the portion in which only the first resin assembly 51 made of PTFE having a relatively high melting point is disposed. As a result, the PTFE forming the first resin assembly 51 and the PFA forming the second resin assembly 53 can be melted substantially at the same time. The first band heater 65 and the second band heater 67 have only to be capable of heating the mold, and other heating devices, such as a rod heater, may be used instead of the band heaters.

In the third embodiment of the resin joined body manufacturing method, the powder or pellets of PFA filled in the accommodation portion 51a (recessed portion) of the first resin assembly 51 may also be used as the second resin assembly 53 instead of the second resin assembly 53 produced by pre-forming. In a case where pellets of PFA is employed rather than powder of PFA, a time until PFA is melted can be delayed.

The resin joined body 59 produced in this way can be used as an intermediate material for various components. A method for manufacturing a component of the diaphragm valve 11 from the resin joined body 59 will be described below as an example.

Figure 6:
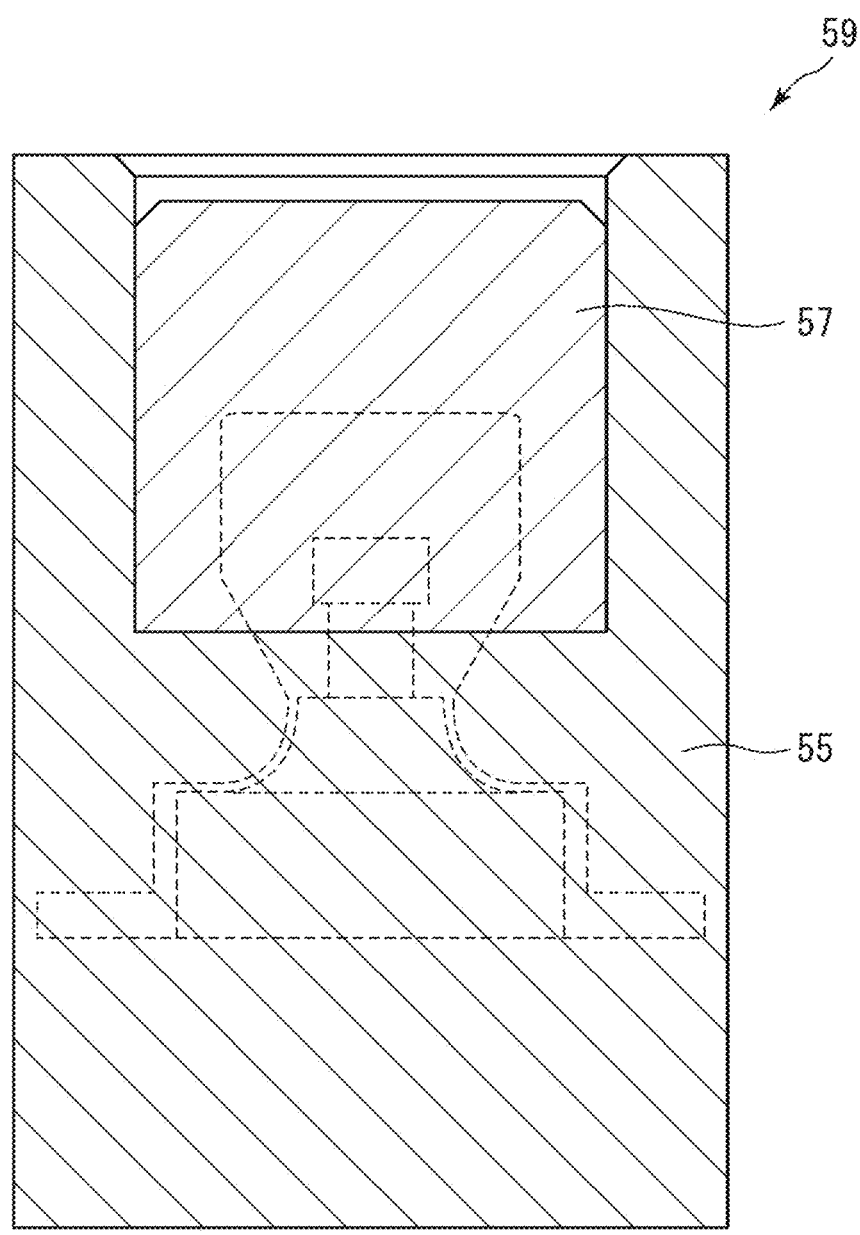
FIG. 6 is a cross-sectional view of the resin joined body in which a shape after cutting is superimposed on the resin joined body and shown by a broken line, to illustrate a step of manufacturing the diaphragm of the diaphragm valve shown in FIG. 1 from the resin joined body shown in FIG. 3 using cutting.
Figure 7:
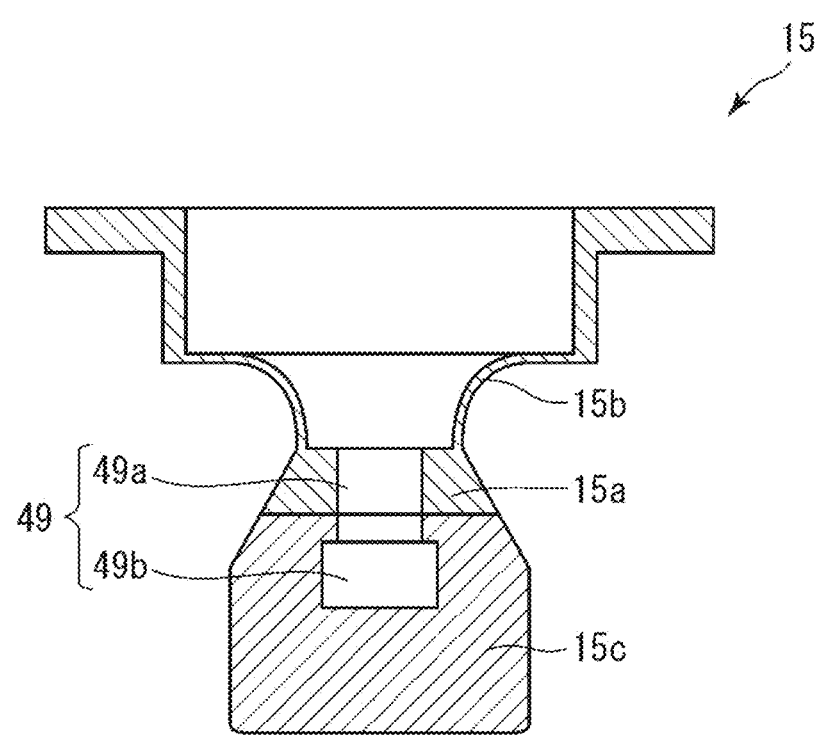
FIG. 7 is a cross-sectional view showing a diaphragm that is produced from the resin joined body shown in FIG. 6 using cutting.

FIG. 6 shows a method for manufacturing the diaphragm 15 from the resin joined body 59. The resin joined body 59 is cut as shown by a broken line in FIG. 6, so that a diaphragm 15 as shown in FIG. 7 can be produced. The diaphragm 15 shown in FIG. 7 is used in the diaphragm valve 11 shown in FIG. 1. In the diaphragm 15, the diaphragm portion 15b having a base portion 15a at a central portion thereof is produced from the first resin molded body 55 of resin joined body 59 made of the first fluororesin material, that is, the diaphragm portion 15b is made of PTFE having high bending durability. Further, the valve element portion 15c of the diaphragm 15 is produced from the second resin molded body 57 of the resin joined body 59 made of the second fluororesin material, that is, the valve element portion 15c is made of PFA having low dusting characteristics. Since the first resin molded body 55 and the second resin molded body 57 of the resin joined body 59 are integrally joined to each other by integral melt molding, the boundary surfaces (joining surfaces) between the base portion 15a and the valve element portion 15c of the diaphragm 15 are also integrally joined. Therefore, even though the valve element portion 15c comes into contact with the valve seat 21 at the time of closing the valve and is deformed due to an impact, a gap is not generated between the boundary surfaces of the base portion 15a and the valve element portion 15c. As a result, it is also possible to prevent a reduction in strength that is caused by liquid in the valve chamber 19 entering the gap. Furthermore, since both the first resin assembly 51 and the second resin assembly 53 are heated as a whole and then cooled, the occurrence of thermal strain is suppressed. As a result, a reduction in strength caused by thermal strain can also be suppressed.

Figure 8:
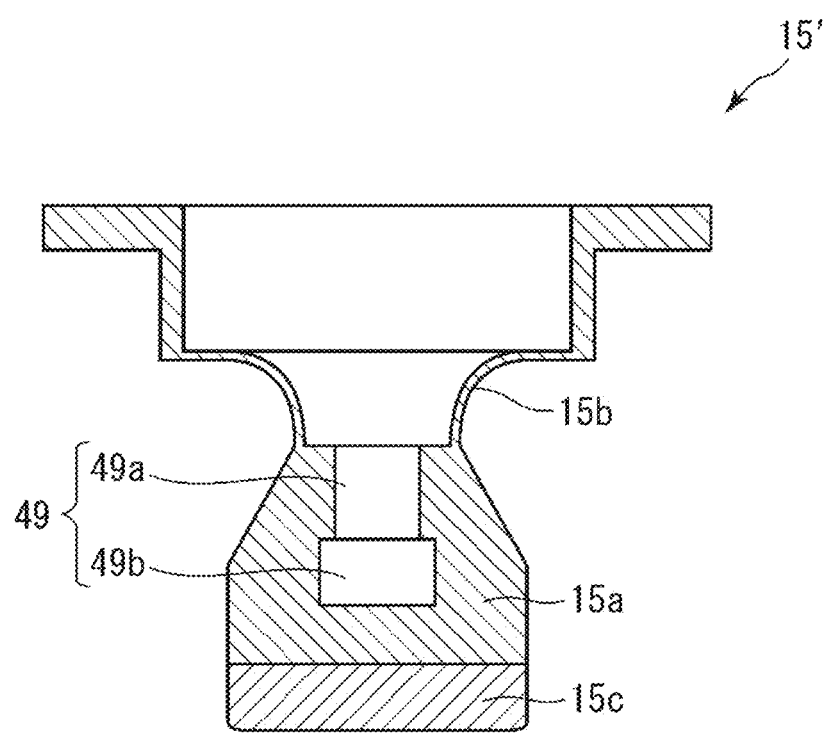
FIG. 8 is a cross-sectional view showing a variation of a diaphragm that is produced from the resin joined body shown in FIG. 3 using cutting.

In addition, in a case where a position at which cutting is to be performed in FIG. 6 is changed, for example, only a vicinity of a valve seat contact surface to come into contact with the valve seat 21 can be produced from the second resin molded body 57 of the resin joined 59, as in a diaphragm 15' shown in FIG. 8, so that only the vicinity of the contact surface to come into contact with the valve seat 21 can be made of PFA having low dusting characteristics. In this case, the connecting hole 49 is provided only in the base portion 15a. The first resin molded body 55 and the second resin molded body 57 of the resin joined body 59 are integrally melted and molded, and the base portion 15a and the valve element portion 15c produced from these molded bodies are integrally formed. Therefore, as the stem 35 is moved upward and downward, the valve element portion 15c can move via the base portion 15a in conjunction with the stem 35 to come into contact with and be separated from the valve seat 21.

Figure 9:
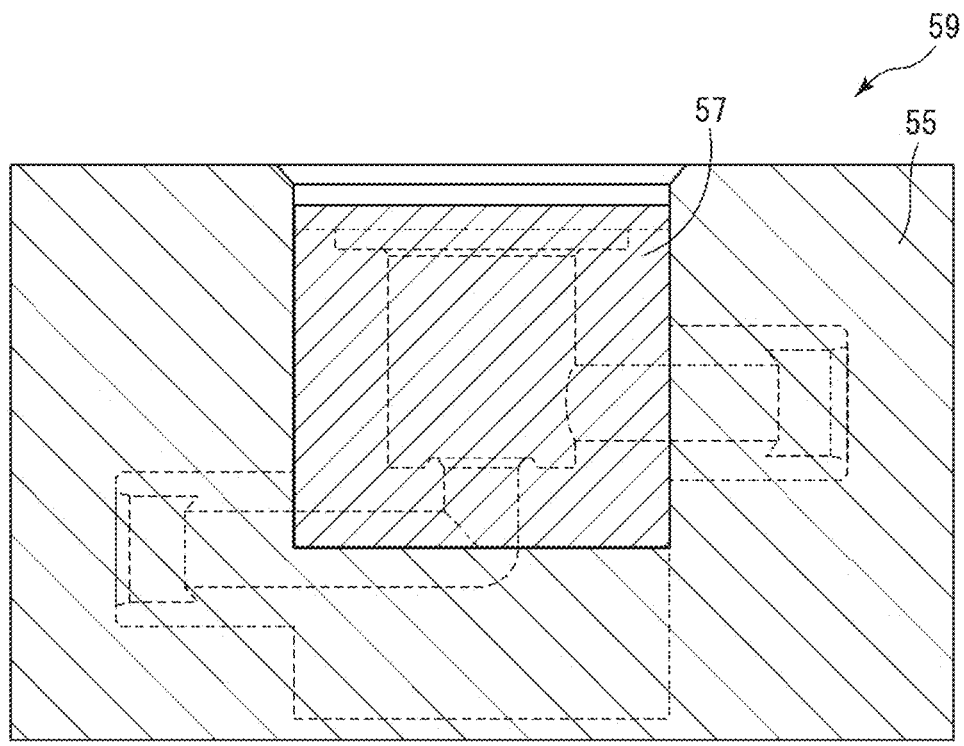
FIG. 9 is a cross-sectional view of the resin joined body in which a shape after cutting is superimposed on the resin joined body and shown by a broken line, to illustrate a step of manufacturing the valve body of the diaphragm valve shown in FIG. 1 from the resin joined body shown in FIG. 3 using cutting.
Figure 10:
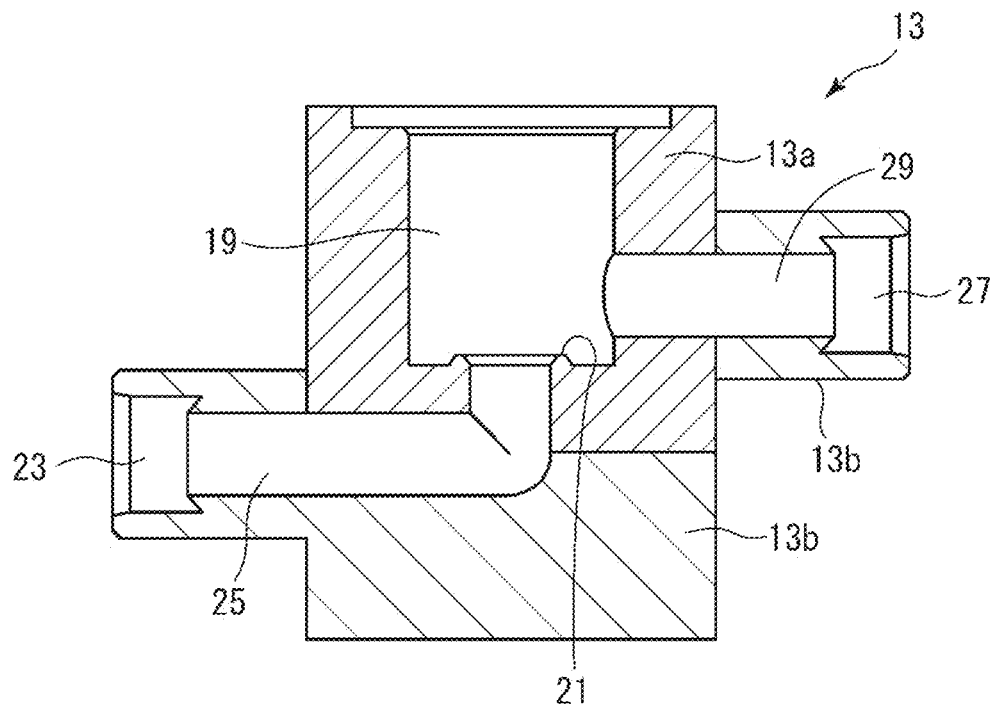
FIG. 10 is a cross-sectional view showing a valve body that is produced from the resin joined body shown in FIG. 9 using cutting.

FIG. 9 shows a method for manufacturing the valve body 13 from the resin joined body 59. The resin joined body 59 is cut as shown by a broken line in FIG. 9, so that the valve body 13 shown in FIG. 10 can be produced. The valve body 13 shown in FIG. 10 is used in the diaphragm valve 11 shown in FIG. 1. In the valve body 13, a first valve body portion 13a having the valve chamber 19 formed therein is produced from the second resin molded body 57 of the resin joined body 59 made of the second fluororesin material, that is, the first valve body portion 13a is made of PFA having low dusting characteristics. Further, a second valve body portion 13b having formed therein the inflow port 23 and the outflow port 27 of the valve body 13 is produced from the first resin molded body 55 of the reins joined body 59 made of the first fluororesin material, that is, the second valve body portion 13b is made of PTFE more inexpensive than PFA. The inlet flow channel 25 and the outlet flow channel 29 are provided over the first valve body portion 13a and the second valve body portion 13b to extend from the inflow port 23 and the outflow port 27 to the valve chamber 19. The valve seat 21 provided in the first valve body portion 13a is made of PFA having low dusting characteristics. Therefore, even though the valve element portion 15c comes into contact with the valve seat 21 at the time of opening and closing the valve, the generation of particles can be suppressed. As a result, the contamination of liquid in the valve chamber 19 due to generated particles can be reduced. The first valve body portion 13a is produced from the second resin molded body 57 made of PFA that is relatively expensive, and the second valve body portion 13b of the valve body 13 is produced from the first resin molded body 55 made of PTFE that is relatively inexpensive. Therefore, it is possible to reduce the cost of the raw material of the valve body 13 while suppressing the generation of particles caused by contact between the valve element portion 15c and the valve seat 21 as compared to a case where both the first valve body portion 13a and the second valve body portion 13b of the valve body 13 are made of PFA.

Figure 11:
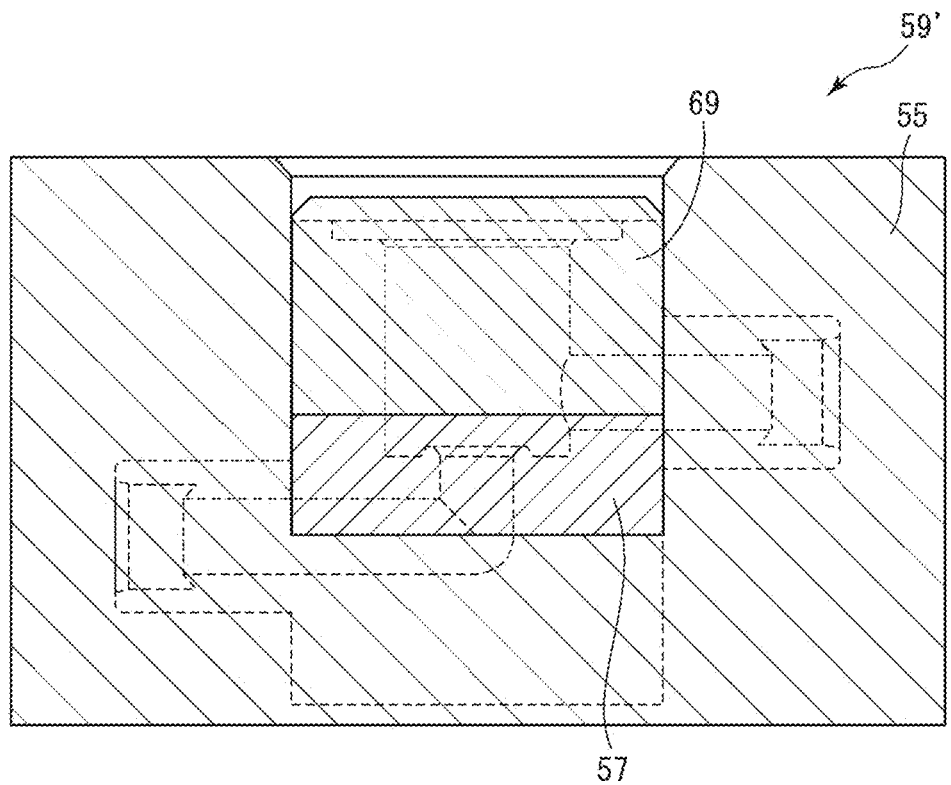
FIG. 11 is a cross-sectional view showing a first variation of the resin joined body that is manufactured by the resin joined body manufacturing method according to the present invention.
Figure 12:
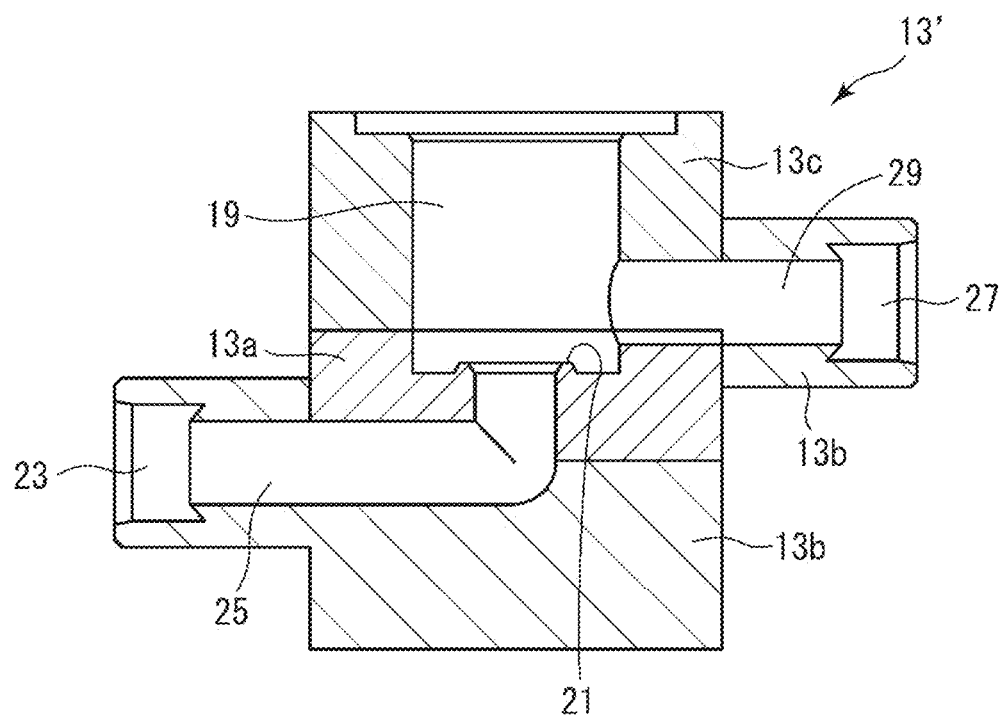
FIG. 12 is a cross-sectional view showing a first variation of a valve body that is produced from the first variation of the resin joined body shown in FIG. 11 using cutting.

In addition, in a case where the second resin assembly 53 disposed in the accommodation portion 51a (recessed portion) of the first resin assembly 51 and a third resin assembly further disposed on the second resin assembly 53 and made of a third fluororesin material are heated to a temperature equal to or higher than melting points thereof and then cooled, it is also possible to produce a resin joined body 59' in which a first resin molded body made of the first fluororesin material, a second resin molded body made of the second fluororesin material and a third resin molded body 69 made of the third fluororesin material are integrally joined to each other by integral melt molding in a state where the second resin molded body is interposed between the first resin molded body and the third resin molded body, as shown in FIG. 11. In a case where cutting is performed as shown by a broken line in FIG. 11 in a state where PTFE is employed as the first fluororesin material and the third fluororesin material and PFA is employed as the second fluororesin material, a valve body 13' shown in FIG. 12 can be produced.

The valve body 13' includes a third valve body portion 13c produced from the third resin molded body 69 made of the third fluororesin material, in addition to the second valve body portion 13b produced from the first resin molded body 55 made of the first fluororesin material and the first valve body portion 13a produced from the second resin molded body 57 made of the second fluororesin material. The valve chamber 19 is produced over the first valve body portion 13a and the third valve body portion 13c such that the valve seat 21 is produced from the second resin molded body 57. Further, the inflow port 23 and the outflow port 27 of the valve body 13 are provided in the second valve body portion 13b produced from the first resin molded body 55, and the inlet flow channel 25 and the outlet flow channel 29 are provided over the second valve body portion 13b of the resin joined body 59 produced from the first resin molded body 55 and the first valve body portion 13a of the resin joined body 59 produced from the second resin molded body 57 to extend from the inflow port 23 and the outflow port 27 to the valve chamber 19. In such a valve body 13', only a part of the valve chamber 19 including the valve seat 21 which the valve element portion 15c comes into contact with and is separated from at the time of opening and closing the valve is made of PFA that has low dusting characteristics but is relatively expensive. As a result, it is possible to suppress the generation of particles caused by an impact when the valve element portion 15c comes into contact with the valve seat 21 at the time of closing valve, and to further reduce the cost of a raw material as compared to the valve body 13 shown in FIG. 10.

Figure 13:
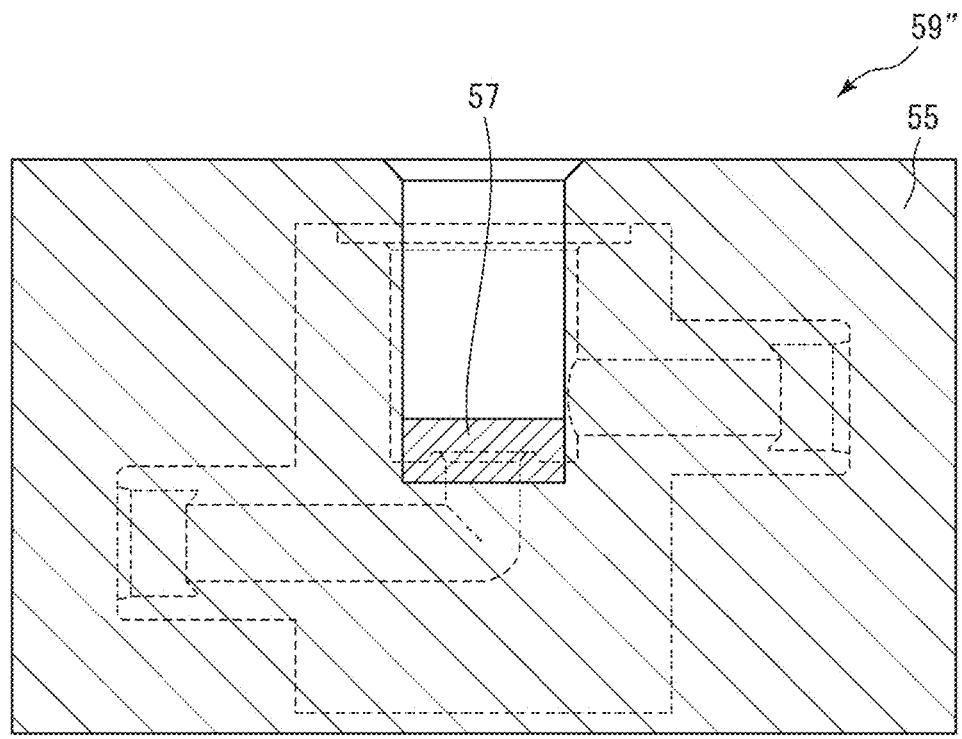
FIG. 13 is a cross-sectional view showing a second variation of the resin joined body that is manufactured by the resin joined body manufacturing method according to the present invention.
Figure 14:
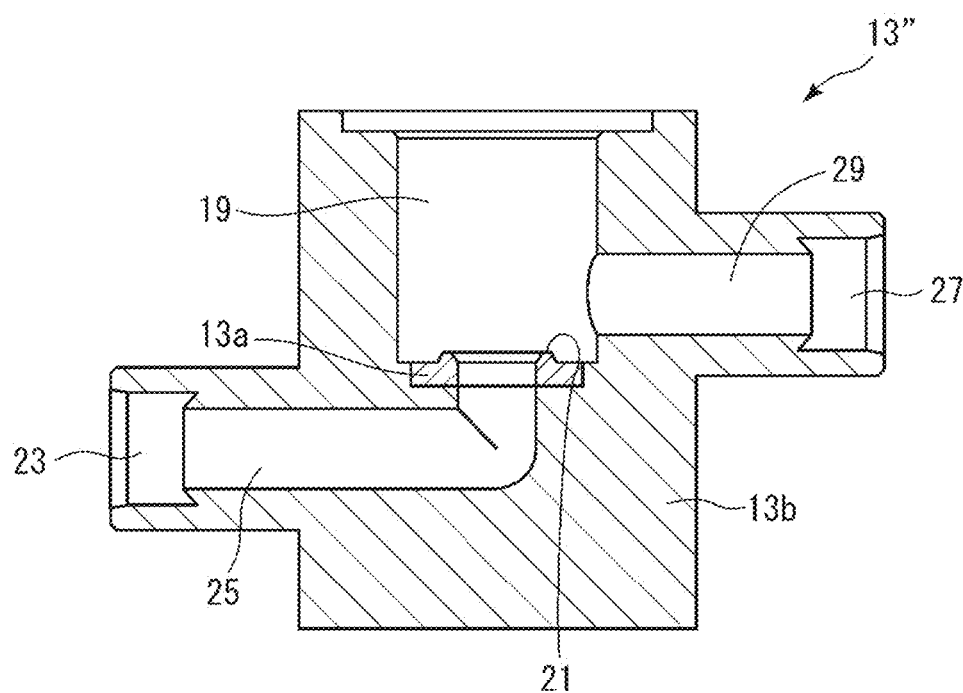
FIG. 14 is a cross-sectional view showing a second variation of a valve body that is produced from the second variation of the resin joined body shown in FIG. 13 using cutting.

Furthermore, in a case where the first resin assembly 51 having the second resin assembly 53 of a volume smaller than the volume of the accommodation portion 51a disposed in the accommodation portion 51a (recessed portion) of the first resin assembly 51 is heated to a temperature equal to or higher than melting points of the first fluororesin material and the second fluororesin material (that is, a temperature equal to or higher than higher one of the melting point of the first fluororesin material and the melting point of the second fluororesin material) and then cooled, it is also possible to produce a resin joined body 59" in which only a part of the accommodation portion 51a is filled with the second resin molded body made of the second fluororesin material and the first resin assembly and the second resin molded body are integrally joined to each other by integral melt molding as shown in FIG. 13. In a case where cutting is performed as shown by a broken line in FIG. 13 in a state where PTFE is employed as the first fluororesin material and PFA is employed as the second fluororesin material, a valve body 13" shown in FIG. 14 can be produced. In the valve body 13", only a portion of the valve chamber 19 that forms the valve seat 21 is constituted by a first valve body portion 13a produced from the second resin molded body 57 made of the second fluororesin material, and a remaining portion is constituted by a second valve body portion 13b produced from the first resin molded body 55 made of the first fluororesin material. Only a part of the valve chamber 19 forming the valve seat 21 which the valve element portion 15c comes into contact with and is separated from at the time of opening and closing the valve is made of PFA that has low dusting characteristics but is relatively expensive. As a result, it is possible to suppress the generation of particles caused by an impact when the valve element portion 15c comes into contact with the valve seat 21 at the time of closing valve, and to further reduce the cost of a raw material as compared to the valve body 13 shown in FIG. 12. In addition, since a space portion of the valve chamber 19 overlaps with a portion of the accommodation portion 51a that is not used as the second resin molded body, the amount of a portion to be unnecessarily cut can be reduced, resulting in reduction of the cost for a raw material.

The methods for producing the diaphragms 15 and 15' and the valve bodies 13, 13', and 13" of the diaphragm valves 11 from the resin joined bodies 59, 59', and 59" manufactured by the resin joined body manufacturing method according to the present invention have been described above. However, even though a valve element portion and a valve body of another type of valve, such as a constant-pressure valve or a flow regulating valve, are produced from the resin joined body manufactured by the resin joined body manufacturing method according to the present invention, the same effects as those of the diaphragms 15 and 15' and the valve bodies 13, 13', and 13" of the diaphragm valves 11 produced as described above can be obtained.

Next, the operation of the diaphragm valve 11 will be described with reference to FIG. 1. As shown in FIG. 1, the piston 37 of the drive unit 17 is biased downward and pushed downward by the coil spring 39 in a normal time when working fluid is not supplied from the working fluid supply port 47 to the drive unit 17. As a result, the valve element portion 15c is moved in a direction of approaching the valve seat 21 via the stem 35 and is brought in pressure contact with the valve seat 21, so that the diaphragm valve 11 is in a closed state as shown in FIG. 1. Accordingly, the diaphragm portion 15b supporting the valve element portion 15c via the base portion 15a is also deformed in a direction away from the drive unit 17. When the working fluid is supplied to the working fluid supply port 47 of the drive unit 17 in this state, the fluid pressure of the working fluid flowing into the lower space 43 of the cylinder portion acts upward on the piston body 37a to push up the piston 37 against the biasing force of the coil spring 39. In this time, air in the upper space 41 is discharged to the outside through the vent hole 45. As a result, the valve element portion 15c is moved in a direction away from the valve seat 21 via the stem 35, so that the diaphragm valve 11 is in an open state. Accordingly, the diaphragm portion 15b is also deformed in the direction of approaching the drive unit 17. When the supply of the working fluid to the working fluid supply port 47 is stopped, the piston 37 is biased downward and pushed downward by the coil spring 39 again and the valve element portion 15c is brought in pressure contact with the valve seat 21. As a result, the diaphragm valve 11 is in a closed state again.

As described above, in the diaphragm valve 11, the valve element portion 15c comes into contact with and is separated from the valve seat 21 repeatedly. Particularly, particles are likely to be generated due to an impact when the valve element portion 15c comes into contact with the valve seat 21. However, since the valve element portion 15c to come into contact with the valve seat 21 is made of PFA having low dusting characteristics in the diaphragm valve 11, the generation of particles from the valve element portion 15c can be suppressed. Likewise, since the first valve body portion 13a of the valve body 13 in which the valve chamber 19 is formed is also made of PFA having low dusting characteristics, the generation of particles from the valve seat 21 can be suppressed. Further, the intermediate material of the diaphragm 15 is produced as the resin joined body 59 in which both the first resin molded body 55 made of PTFE and the second resin molded body 57 made of PFA are heated and melted as a whole so that the first resin molded body 55 and the second resin molded body 57 are integrally joined to each other by integral melt molding. Therefore, even though the valve element portion 15c comes into contact with the valve seat 21 and is deformed due to an impact, a gap is not generated between the valve element portion 15c and the base portion 15a. Further, since thermal strain also does not occur, a reduction in strength caused by heating can be prevented not only in the valve body 13 but also in the diaphragm 15. Furthermore, since the second valve body portion 13b other than the first valve body portion 13a that comes into contact with and is separated from the valve element portion 15c repeatedly is made of PTFE more inexpensive than PFA, an increase in manufacturing cost of the valve body 13 can also be suppressed as compared to a case where the entire valve body 13 is manufactured with PFA. Such an effect can be obtained likewise even in a case where the resin joined body according to the present invention is applied to a constant-pressure valve or a flow regulating valve that includes a base portion, a valve element portion, and a valve body having a valve seat which the valve element portion comes into contact with and is separated from, other than an on-off valve, such as the diaphragm valve 11 described above.

The resin joined body manufacturing method according to the present invention, and methods of manufacturing the diaphragm 15 for a diaphragm valve and the diaphragm valve 11 using the diaphragm 15, from the resin joined body 59 manufactured by the above resin joined body manufacturing method have been described with reference to the embodiments shown in the drawings. However, the present invention is not limited to the embodiments shown in the drawings. For example, PTFE is exemplified as the first fluororesin material and PFA is exemplified as the second fluororesin material in the above description. However, as long as the first fluororesin material can gel and maintain a shape even though being melted when being heated to a temperature equal to or higher than a melting point thereof and the second fluororesin material is melted to be changed into a liquid state when being heated to a temperature equal to or higher than a melting point thereof, the first fluororesin material and the second fluororesin material are not limited to PTFE and PFA. For example, an ethylene tetrafluoroethylene copolymer (ETFE), a perfluoroethylene propene copolymer (FEP), a polyvinylidene fluoride (PVDF), or the like may be used as the second fluororesin material instead of PTFE. Further, in the resin joined body manufacturing method according to the present invention, the second resin assembly 53 has only to be capable of being accommodated in the accommodation portion 51a, and a bottom portion of the first resin assembly 51 formed in a cylindrical shape may be placed on a mold, so that a bottom portion of the internal space of the cylindrical first resin assembly 51 may be closed by the mold to form a recessed portion serving as the accommodation portion 51a, and the second resin assembly 53 may be accommodated in the recessed portion formed in this way. In this case, it is preferable that the mold has a tub shape or a dish shape.

Figure 15:
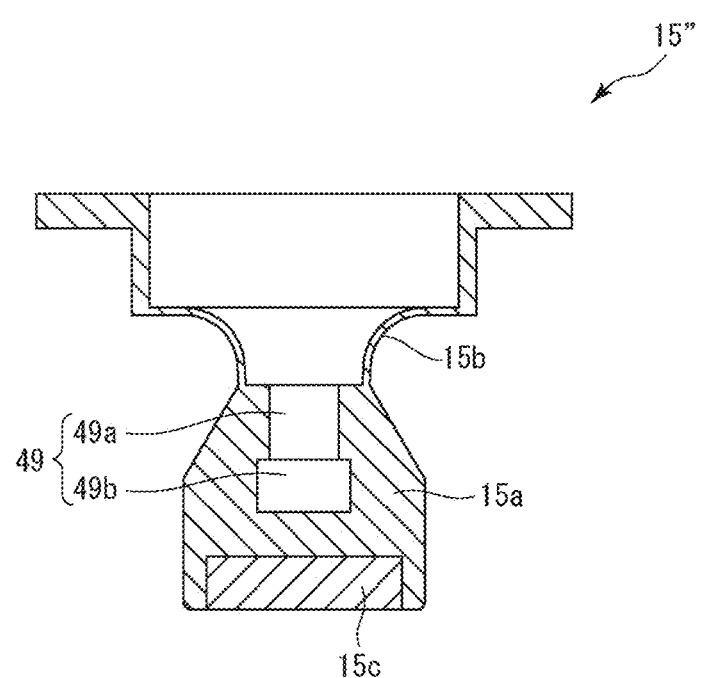
FIG. 15 is a cross-sectional view showing another variation of the diaphragm that is produced from the resin joined body shown in FIG. 3 using cutting.

Furthermore, depending on the appropriate position from which a component to be produced from the resin joined body 59 is cut out, a range of the component to be made of a different fluororesin material can be changed. For example, a position where a diaphragm is cut out from the resin joined body 59 can also be changed such that the entire valve seat contact surface of the valve element portion 15c of the diaphragm 15 or 15', which comes into contact with the valve seat 21, is not produced from the second resin molded body 57 made of PFA having low dusting characteristics as in the diaphragm 15 shown in FIG. 7 or the diaphragm 15' shown in FIG. 8 and only a part of the valve seat contact surface of the diaphragm 15" is produced from the second resin molded body 57 as in the diaphragm 15" shown in FIG. 15.

Figure 16:
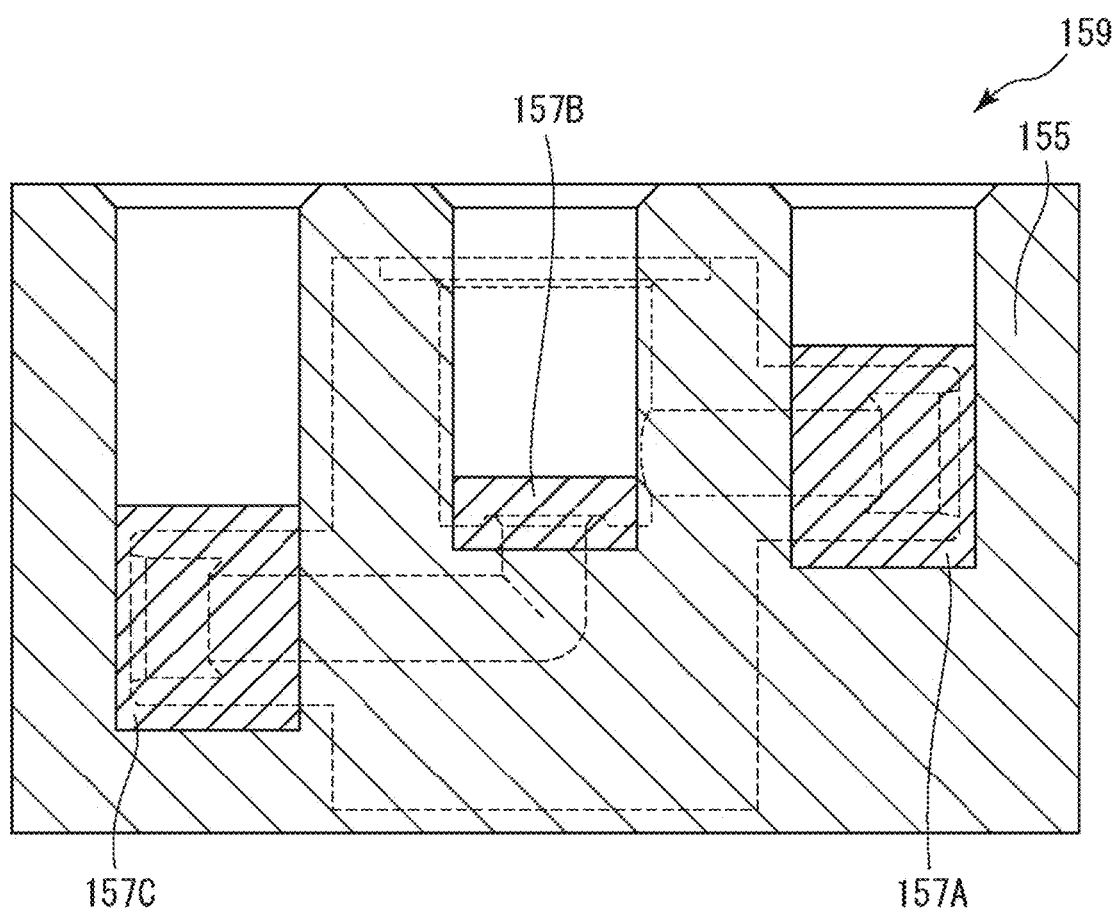
FIG. 16 is a cross-sectional view showing a third variation of the resin joined body that is manufactured by the resin joined body manufacturing method according to the present invention.
Figure 17:
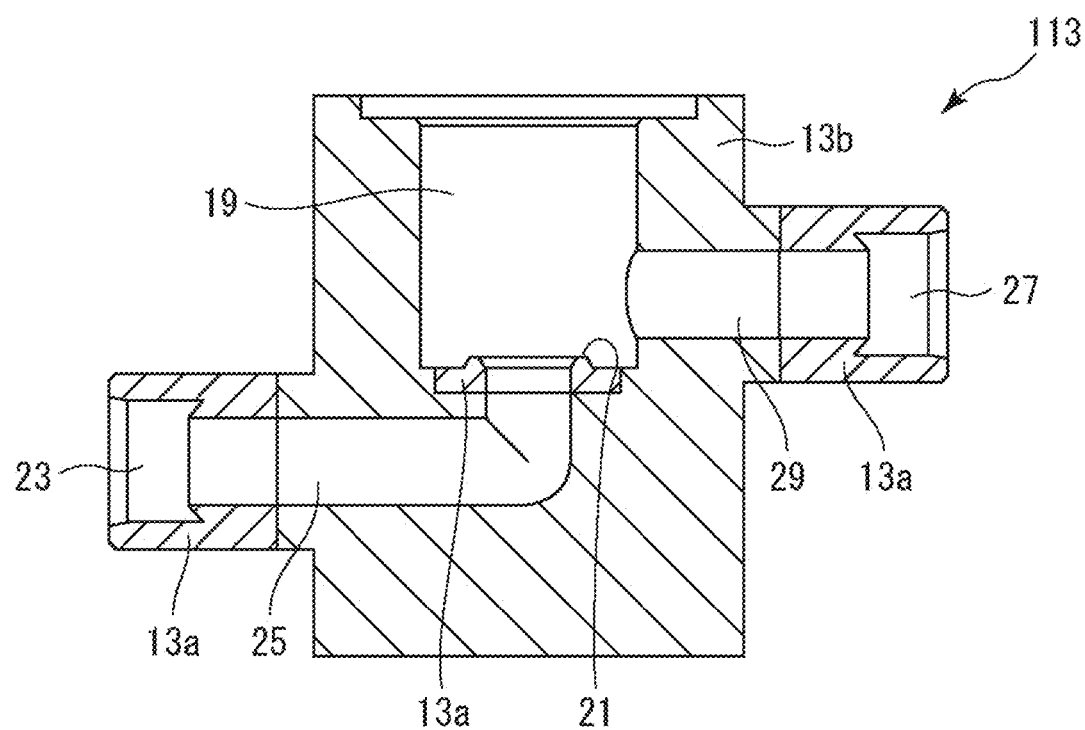
FIG. 17 is a cross-sectional view showing a third variation of a valve body that is produced from the third variation of the resin joined body shown in FIG. 16 using cutting.

In addition, the number of the accommodation portions 51a of the first resin assembly 51 or the volume of the second resin assembly 53 to be disposed in each of the accommodation portions 51a may be changed in accordance with the arrangement of portions, which are desired to be made of different fluororesin materials, to manufacture the resin joined body 59. For example, three accommodation portions 51a are formed in the first resin assembly 51, PTFE is employed as the first fluororesin material, and PFA is employed as the second fluororesin material, thereby manufacturing a resin joined body 159 in which second resin molded bodies 157A, 157B, and 157C made of the second fluororesin material are formed at positions away from each other in the first resin molded body 155 made of the first fluororesin material as shown in FIG. 16. Cutting is performed on the resin joined body 159 as shown by a broken line in FIG. 16, so that a valve body 113 shown in FIG. 17 can be produced. In the valve body 113, only a portion of the valve chamber 19 that forms the valve seat 21, an inlet joint portion where an inflow port 23 connected to an inlet flow channel 25 is formed, and an outlet joint portion where an outflow port 27 connected to an outlet flow channel 29 is formed are constituted by a first valve body portion 13a produced from the second resin molded body 57 made of the second fluororesin material, and a remaining portion is constituted by a second valve body portion 13b produced from the first resin molded body 55 made of the first fluororesin material. In a case where only a part of the valve chamber 19 forming the valve seat 21 which the valve element portion 15c comes into contact with and is separated from at the time of opening and closing the valve and joint portions to which tubes are connected are made of PFA that has low dusting characteristics and high abrasion resistance but is relatively expensive, it is possible to suppress the generation of particles caused by an impact when the valve element portion 15c comes into contact with the valve seat at the time of closing the valve and to suppress the abrasion of the joints at the time of connecting the tube.

Figure 18:
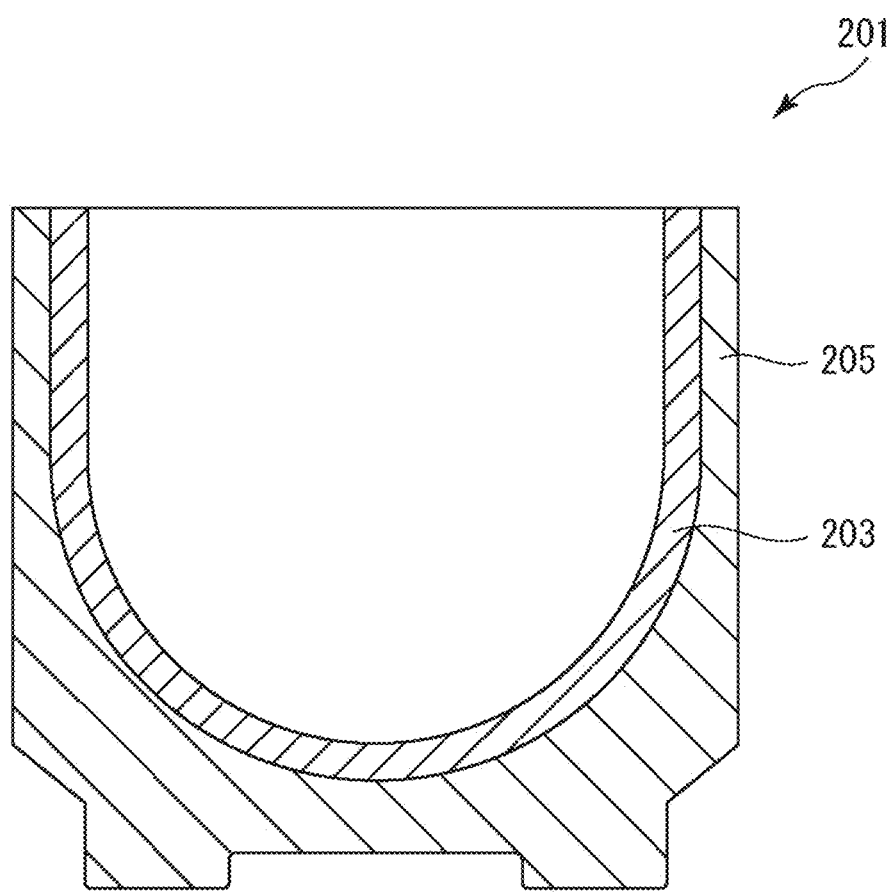
FIG. 18 is a cross-sectional view showing a wafer transport box that is produced from the resin joined body manufactured by the resin joined body manufacturing method according to the present invention using cutting.
Figure 19:
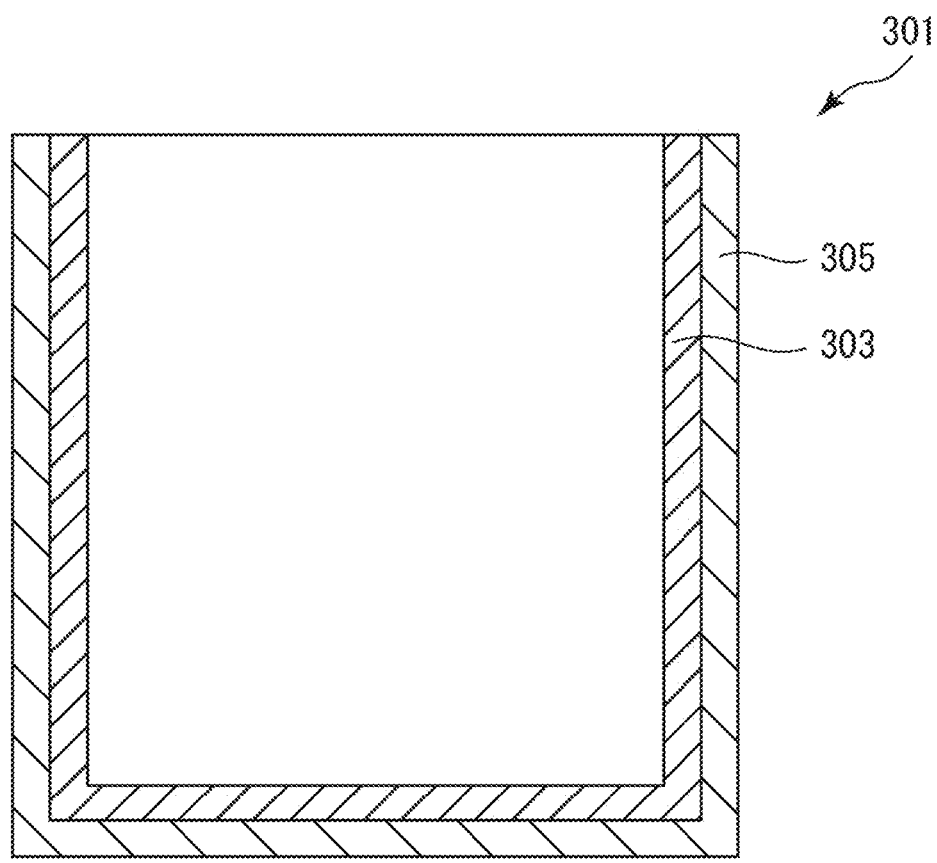
FIG. 19 is a cross-sectional view showing a tank that is produced from the resin joined body manufactured by the resin joined body manufacturing method according to the present invention using cutting.

In addition, the production of components of the diaphragm valve 11 from the resin joined body 59 manufactured according to the present invention has been exemplified in the above description, but components to be produced from the resin joined body 59 manufactured according to the present invention are not limited to the components of the diaphragm valve and may be components of other types of valves or other types of components. For example, the shape of the second resin molded body 57 is changed, PTFE is employed as the first fluororesin material, and PFA is employed as the second fluororesin material, thereby manufacturing the resin joined body 59, so that a wafer transport box (so-called hoop) 201 that includes a first portion 203 positioned on an inner surface side and made of PFA and a second portion 205 positioned on an outer surface side and made of PTFE as shown in FIG. 18 can be produced. Since the inner surface side to come into contact with a wafer is made of PFA having high abrasion resistance in the wafer transport box 201, abrasion can be suppressed. Further, PTFE is employed as the first fluororesin material and PFA is employed as the second fluororesin material, thereby manufacturing the resin joined body 59, so that a tank 301 that includes an inner layer 303 positioned on an inner surface side and made of PFA and an outer layer 305 positioned on an outer surface side and made of PTFE as shown in FIG. 19 can be produced. In addition, it is possible to produce a pump, a nozzle, a pressure sensor, and the like from the resin joined body 59 manufactured according to the present invention.

DESCRIPTION OF REFERENCE NUMERALS

11: diaphragm valve
13: valve body
13': valve body
13": valve body
13a: first valve body portion
13b: second valve body portion
13c: third valve body portion
15: diaphragm
15': diaphragm
15": diaphragm
15a: base portion
15b: diaphragm portion
15c: valve element portion
19: valve chamber
21: valve seat
25: inlet flow channel
29: outlet flow channel
51: first resin assembly
51a: accommodation portion
53: second resin assembly
55: first resin molded body
57: second resin molded body
59: resin joined body
59': resin joined body
59": resin joined body
113: valve body
155: first resin molded body
157A: second resin molded body
157B: second resin molded body
157C: second resin molded body
159: resin joined body
201: wafer transport box
203: first portion
205: second portion
301: tank
303: inner layer
305: outer layer

The invention claimed is:

1. A resin joined body manufacturing method of manufacturing a resin joined body in which two resin molded bodies made of different fluororesin materials are joined to each other, said resin joined body manufacturing method comprising:
a step of forming a first resin assembly having a cylindrical accommodation portion from a first fluororesin material that is capable of gelling and maintaining a shape even at a temperature equal to or higher than a melting point thereof;
a step of accommodating a second resin assembly in the accommodation portion, said second resin assembly made of a second fluororesin material that is melted to be in a liquid state at a temperature equal to or higher than a melting point thereof; and a step of heating the first resin assembly having the second resin assembly accommodated in the accommodation portion thereof, to a temperature equal to or higher than the melting points of the first fluororesin material and the second fluororesin material, and then cooling the first resin assembly and the second resin assembly to change the first resin assembly to a first resin molded body and change the second resin assembly to a second resin molded body while joining the first resin molded body and the second resin molded body to each other.

2. The resin joined body manufacturing method according to claim 1, wherein the first resin assembly is formed in a cup shape having a recessed portion at an end portion thereof.

3. The resin joined body manufacturing method according to claim 1, wherein the first resin assembly includes a cylindrical tubular body, and the tubular body has an inside serving as the accommodation portion.

4. The resin joined body manufacturing method according to claim 3, wherein the first resin assembly is configured by the cylindrical tubular body and a solid rod-shaped body or a plate-shaped body that is disposed adjacent to a lower portion of the cylindrical tubular body.

5. The resin joined body manufacturing method according to claim 1, wherein the first resin assembly is a round rod or a plate molded with the first fluororesin material or is formed from the rod or the plate by cutting.

6. The resin joined body manufacturing method according to claim 1, wherein the first resin assembly is formed by cold compression molding or pre-forming of the first fluororesin material.

7. The resin joined body manufacturing method according to claim 5, wherein the second resin assembly is formed by molding of the second fluororesin material to have a shape and a size that allow the second resin assembly to be accommodated in the accommodation portion.

8. The resin joined body manufacturing method according to claim 6, wherein the second resin assembly is formed by molding of the second fluororesin material to have a shape and a size that allow the second resin assembly to be accommodated in the accommodation portion.

9. The resin joined body manufacturing method according to claim 7, wherein the second resin assembly is formed by cold compression molding or pre-forming of the second fluororesin material to have a shape and a size that allow the second resin assembly to be accommodated in the accommodation portion.

10. The resin joined body manufacturing method according to claim 8, wherein the second resin assembly is formed by cold compression molding or pre-forming of the second fluororesin material to have a shape and a size that allow the second resin assembly to be accommodated in the accommodation portion.

11. The resin joined body manufacturing method according to claim 5, wherein the second resin assembly is formed from powder or pellets of the second fluororesin material.

12. The resin joined body manufacturing method according to claim 6, wherein the second resin assembly is formed from powder or pellets of the second fluororesin material.

13. The resin joined body manufacturing method according to claim 1, further comprising a diaphragm manufacturing step of manufacturing a diaphragm for a diaphragm valve from the resin joined body, said diaphragm having a diaphragm portion and a valve element portion supported at a center of the diaphragm portion which comes into contact with and is separated from a valve seat, wherein the diaphragm manufacturing step includes:

a step of performing cutting on a portion of the resin joined body constituted by the second resin molded body to form at least a portion of the valve element portion which comes into contact with the valve seat; and a step of performing cutting on a portion of the resin joined body constituted by the first resin molded body to form the diaphragm portion and a remaining portion of the valve element portion.

14. The resin joined body manufacturing method according to claim 1, further comprising a diaphragm valve manufacturing step of manufacturing a diaphragm valve from the resin joined body, said diaphragm valve including a valve body having formed therein a first flow channel, a second flow channel, and a valve chamber being in communication with the first flow channel and the second flow channel, and a diaphragm having a diaphragm portion and a valve element portion supported at a central portion of the diaphragm portion, wherein the diaphragm valve manufacturing step includes a step of performing cutting on the resin joined body to form the first flow channel, the second flow channel, and the valve chamber from the resin joined body such that the valve seat is formed in at least the second resin molded body of the resin joined body.

15. The resin joined body manufacturing method according to claim 1, wherein the first fluororesin material is polytetrafluoroethylene (PTFE), and the second fluororesin material is perfluoroalkoxy alkane (PFA).

* * * * *